(12) United States Patent
Peng et al.

(10) Patent No.: US 12,185,421 B2
(45) Date of Patent: Dec. 31, 2024

(54) DYNAMICALLY SWITCHING NETWORK CARDS

(71) Applicant: SHENZHEN UCLOUDLINK NEW TECHNOLOGY CO., LTD., Guangdong (CN)

(72) Inventors: Guojia Peng, Guangdong (CN); Ziran Zhang, Guangdong (CN); Zhihui Gong, Guangdong (CN)

(73) Assignee: SHENZHEN UCLOUDLINK NEW TECHNOLOGY CO., LTD., Guangdong (CN)

( * ) Notice: Subject to any disclaimer, the term of this patent is extended or adjusted under 35 U.S.C. 154(b) by 468 days.

(21) Appl. No.: 17/246,784

(22) Filed: May 3, 2021

(65) Prior Publication Data

US 2022/0248207 A1     Aug. 4, 2022

Related U.S. Application Data

(63) Continuation of application No. PCT/CN2021/080843, filed on Mar. 15, 2021, which
(Continued)

(51) Int. Cl.
*H04W 24/08*     (2009.01)
*H04W 8/18*     (2009.01)
*H04W 88/06*     (2009.01)

(52) U.S. Cl.
CPC ........... *H04W 8/183* (2013.01); *H04W 24/08* (2013.01); *H04W 88/06* (2013.01)

(58) Field of Classification Search
CPC ...... H04W 88/06; H04W 24/08; H04W 8/183
(Continued)

(56) References Cited

U.S. PATENT DOCUMENTS

| 11,622,248 B2 * | 4/2023 | Kahn | H04L 12/1403 |
| | | | 455/406 |
| 2007/0004457 A1 * | 1/2007 | Han | H04W 8/20 |
| | | | 455/558 |

(Continued)

FOREIGN PATENT DOCUMENTS

| CN | 105682077 A | * | 6/2016 | H04W 8/18 |
| CN | 106412871 A | | 2/2017 | |

(Continued)

OTHER PUBLICATIONS

Chinese Office Action corresponding to CN Application No. 202180004638.0; Issue Date, Sep. 23, 2023.

(Continued)

*Primary Examiner* — Qutbuddin Ghulamali
(74) *Attorney, Agent, or Firm* — CANTOR COLBURN LLP

(57) ABSTRACT

A method for switching between different SIM cards for wireless service includes detecting a status of a network used for voice and data and determining if a physical SIM card is a network card in a wireless client. When the physical SIM card is the network card, the method includes determining whether the wireless client includes one or more cloud SIM cards. When the wireless client includes one or more cloud SIM cards, the method further includes detecting a network status of the physical SIM card and assessing whether the network status of the physical SIM card or the status of the network requires using the one or more cloud SIM cards. When the one or more cloud SIM cards are required, the method includes switching the network card from the physical SIM card to the one or more cloud SIM cards.

14 Claims, 18 Drawing Sheets

Related U.S. Application Data is a continuation of application No. PCT/CN2021/074482, filed on Jan. 29, 2021.

(58) Field of Classification Search
USPC .......................................................... 455/418
See application file for complete search history.

(56) References Cited

U.S. PATENT DOCUMENTS

| | | | |
|---|---|---|---|
| 2014/0325515 A1* | 10/2014 | Salmela | G06F 9/4856 |
| | | | 718/1 |
| 2016/0007188 A1* | 1/2016 | Wane | H04L 63/0823 |
| 2018/0367983 A1 | 12/2018 | Lou et al. | |
| 2022/0248278 A1* | 8/2022 | Huang | H04W 36/00222 |

FOREIGN PATENT DOCUMENTS

| | | | | |
|---|---|---|---|---|
| CN | 110072263 A | * | 3/2019 | ............ H04W 36/00 |
| CN | 111542081 A | * | 8/2020 | ............ H04W 24/04 |
| CN | 112261622 A | | 1/2021 | |
| WO | 2016145742 A1 | | 9/2016 | |
| WO | 2020192537 A1 | | 10/2020 | |

OTHER PUBLICATIONS

International Search Report for International Application No. PCT/CN2021/080843; Mailing Date, Oct. 26, 2021.

\* cited by examiner

DYNAMICALLY SWITCHING NETWORK CARDS

CROSS REFERENCE TO RELATED APPLICATION

This application is a Continuation application of PCT/CN2021/080843 filed on Mar. 15, 2021, which claims priority to PCT/CN2021/074482 filed on Jan. 29, 2021. The entire contents of each of which are incorporated herein in their entirety.

BACKGROUND

Most terminals only enable the use of a Dual SIM Dual Standby process allowing access to services provided only by a SIM card operator, such as a wireless provider. There are many cloud SIM card solutions in the prior art that attempt to solve the problem of different network coverage by different operators. However, these solutions do not provide the capabilities for: 1) switching from a physical SIM card to a cloud SIM card, and switching back to the physical SIM card whenever the physical SIM card can be registered; or 2) switching from a physical SIM card to dual cloud SIM cards when the physical SIM card is out of coverage or international roaming.

BRIEF SUMMARY

According to one aspect of the subject matter described in this disclosure, a method for downloading a cloud SIM card is provided. The method includes the following: detecting a status of a network used for voice and data; determining if an optimal cloud SIM card is on standby in a wireless client; detecting a network status of a physical SIM card in use in the wireless client when the optimal cloud SIM card is not on standby in the wireless client; determining if the network status of the physical SIM card or the status of the network requires a new cloud SIM card download; downloading a new cloud SIM card when the new cloud SIM card download is required; and activating the new cloud SIM card for use with the wireless client.

According to another aspect of the subject matter described in this disclosure, a method for handling network failure of a wireless network is provided. The method includes the following: determining if a physical SIM card of a wireless device fails to access a network; determining if there is a cloud SIM card is registered with the network; activating a soft SIM card to download a new cloud SIM card from a cloud server if the cloud SIM card is not registered with the network and the physical SIM card fails to access the network; activating the new cloud SIM card; deactivating the soft SIM card; and activating the physical SIM card after the new cloud SIM card is activated.

According to another aspect of the subject matter described in this disclosure, a method for switching between different SIM cards for wireless service is provided. The method includes the following: detecting a status of a network used for voice and data; determining if a physical SIM card is a network card in a wireless client; when the physical SIM card is the network card, determining whether the wireless client includes one or more cloud SIM cards; when the wireless client includes one or more cloud SIM cards, detecting a network status of the physical SIM card; assessing whether the network status of the physical SIM card or the status of the network requires using the one or more cloud SIM cards; and when the one or more cloud SIM cards are required, switching the network card from the physical SIM card to the one or more cloud SIM cards.

According to another aspect of the subject matter described in this disclosure, a method for switching between different SIM cards for wireless service is provided. The method includes the following: determining a plurality of cloud SIM cards are available in a wireless client coupled to a network, wherein a first cloud SIM card of the plurality of cloud SIM cards is operating as a network card providing service to the wireless client; monitoring signal levels of the cloud SIM cards; comparing the signal levels of the cloud SIM cards; determining whether to switch the network card from the first cloud SIM card to a second cloud SIM card of the plurality of clouds cards having a stronger signal level; in response to the network card needing to be switched, switching the network card from the first cloud SIM card to the second cloud SIM card.

According to another aspect of the subject matter described in this disclosure, a method for switching between different SIM cards for wireless service is provided. The method includes the following: detecting a status of a network used for voice and data; determining if one or more cloud SIM cards are a network card in a wireless client coupled to the network; in response to determining the one or more cloud SIM cards are the network card, determining whether the wireless client includes a physical SIM card; in response to determining the wireless client includes the physical SIM card, detecting a network status of the one or more cloud SIM cards; assessing whether the network status of the one or more cloud SIM cards or the status of the network requires using the physical SIM card; and when the physical SIM card is required, switching the network card from the one or more cloud SIM cards to the physical SIM card.

Additional features and advantages of the present disclosure are described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Figure 1:
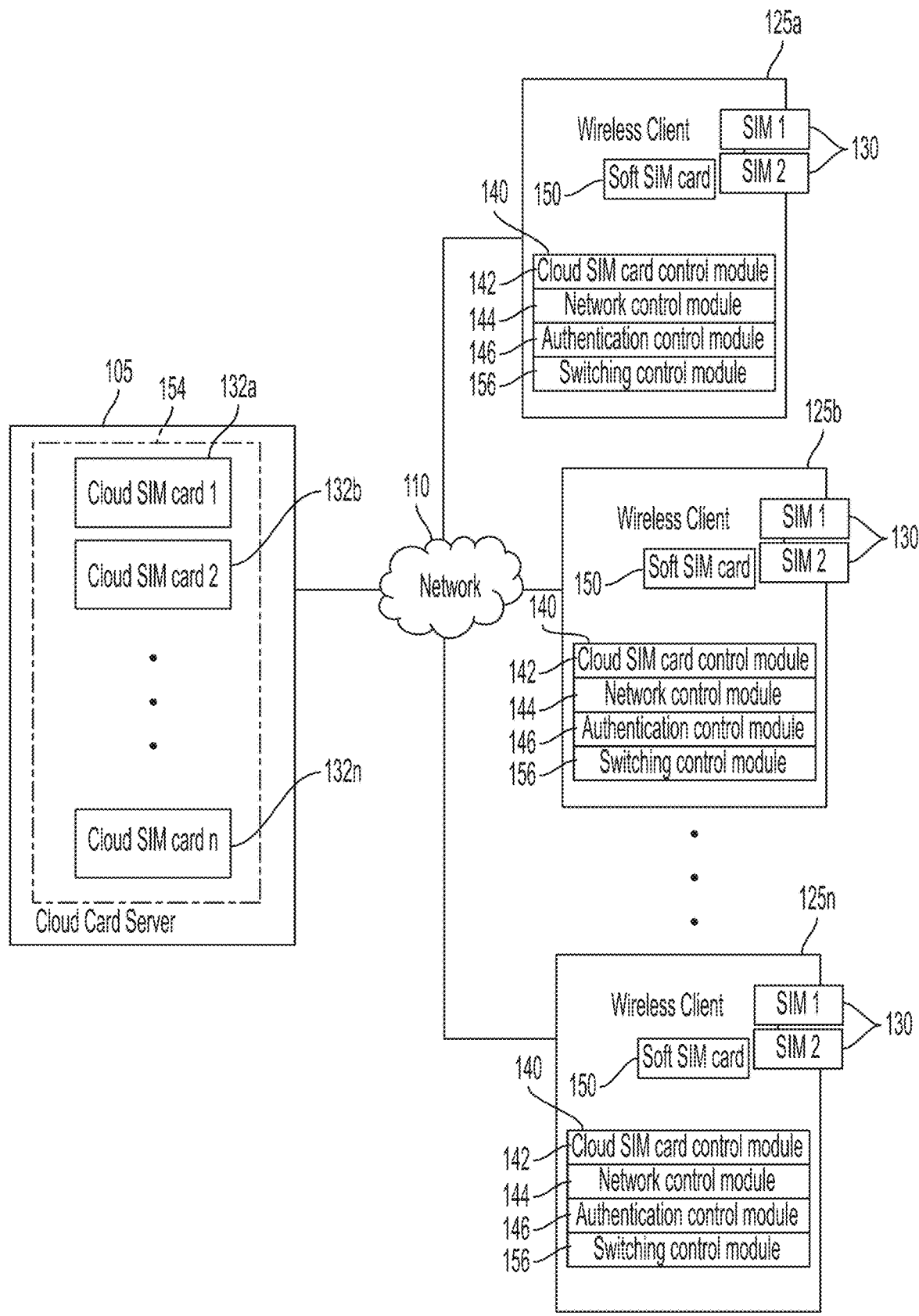
FIG. 1 is a high-level network system for voice and data, according to one embodiment.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

The disclosure includes a system and method for determining how to activate/deactivate one or more cloud SIM cards to access the services of a wireless operator. Moreover, the disclosure includes a method to determine how to acquire a cloud card, and switch a network card between a cloud card and a physical SIM card and/or other cloud SIM cards. In this disclosure, a network card may refer to a SIM structure (one or more physical SIM cards or one or more cloud SIM cards) whose data network is the default data channel used to provide wireless service to wireless client 125.

Illustrated in FIG. 1 is a high level wireless network system 100 for voice and data. In the depicted implementation, the system 100 may include a cloud SIM card server 105 communicatively coupled to a plurality of secure computing clients 125 via the network 110. The wireless clients 125 may be any wireless devices that use network 110 for voice and data. The wireless clients 125 may in turn be communicatively coupled to a SIM card 130 via one or more slots. While a cloud SIM card server 105 is illustrated, the disclosed principles and techniques could be expanded to include multiple servers 105.

The cloud SIM card server 105 may be equipped with a SIMBANK device 154 that stores 1 to N (no upper limit) cloud SIM cards of various countries and operators. The cloud SIM card server 105 may communicate with SIMBANK device 154 in real-time. Each cloud SIM card cloud 132 may be associated with either a physical SIM card or soft SIM card inserted in the SIMBANK device 154. When a wireless client 125 may need a cloud SIM card 132, it may send a cloud SIM card allocation request to the cloud SIM card server 105. Cloud SIM server 105 may select an appropriate cloud SIM card 132 to be allocated to the wireless client 125 according to the requested information (such as the terminal address) and set rules.

Also, the wireless client 125 should be successfully registered to the network 110 before using the data network, making calls, or sending text messages. In the registration process, the SIM (subscriber identity module) card issued by a network operator may be authenticated by the operator's network 110. The authentication process may involve performing an authentication calculation using a SIM card internal algorithm. In this case, the physical SIM card 130 or the soft SIM card 150 of the wireless client 125 may directly perform the authentication calculation for registering with network 110.

The registration process for cloud SIM card 132 may be different because the information regarding the corresponding physical SIM card associated with the cloud SIM card 132 is stored remotely. When the wireless client 125 uses the cloud card to register to network 110, the wireless client 125 may need to forward the authentication request from network 110 to the cloud SIM card server 105. The cloud SIM card server 105 may notify the corresponding physical cloud SIM card of the authentication request from network 110. Afterward, the physical cloud SIM card may internally calculate the authentication result and send the result to the cloud SIM card server 105. Cloud SIM card server 105 may return the result to the wireless client 125 via a data channel. The wireless client 125 may further return the result to the same network operator to establish the wireless service. The registration of the cloud SIM card 132 is finally completed, which can be used on standby when needed.

The registration and authentication process of the cloud SIM cards 132 may require that the wireless client 124 have an available data channel. This data channel can be another wireless network data channel, such as the data network of another physical SIM card of the wireless client 125 or a built-in soft SIM card 150.

Each wireless client 125 may include a built-in soft SIM card 150. Usually the soft SIM card 150 is not used. Only when the user's physical SIM card 130 and cloud SIM card 132 are unavailable, the soft SIM card 150 may be enabled to register to the network 110, and then the data network/data channel of the soft SIM card 150 is used. The wireless client 125 may request the cloud SIM card server 105 to download a cloud SIM card and register the cloud SIM card to the network 110. When the cloud card registration network is normal, or the physical SIM card is normally registered to the network, the soft card may be recycled and used as a backup.

Generally, two SIM cards may be registered to network 110 at the same time in a dual-card dual-standby mode to support the wireless client 125 to be able to access network 110 supported by the SIM card assigned as the network card to obtain wireless services. The dual SIM cards can be a physical SIM card 130 or cloud SIM card 132 (dynamically downloaded from the server 105).

The cloud SIM card server 105, according to some embodiments, may be configured to store a plurality of SIM card data in a secure environment requiring authentication before access is granted to the SIM card data. SIM card data may include physical SIM card 130 or cloud SIM card 132. In addition, the cloud SIM card server 105 may be configured to manage or otherwise maintain the integrity and/or version updates of the SIM card data so that a user (e.g., a user of the wireless client) does not have to deal with such data maintenance processes as the SIM card data changes and/or grows. The cloud SIM card server 105 may be configured to have storage logic that is executable to store SIM card data that is shared across multiple wireless clients 125. According to one implementation, the cloud SIM card server 105 includes a plurality of non-volatile/non-transitory storage media such as solid state storage media, hard disk storage media, virtual storage media, cloud-based storage drives, storage servers, and/or the like. The plurality of storage media may be configured to store data from a plurality of sources. For example, the cloud SIM card server 105 may include storage logic that is executable to store SIM card data derived from, for example, authentication data, SIM units identification data, etc. According to some implementations, the storage logic of the cloud SIM card server 105 may be configured to automatically monitor and/or update relevant SIM card data obtained from a third-party source. For example, the storage logic of the cloud SIM card server 105 may periodically monitor updates associated with SIM card data from third-party organizations/sources and automatically update different versions of the SIM card data within one or more storage media of the cloud SIM card server 105. In one embodiment, the storage logic of the cloud SIM card server 105 manipulates or otherwise formats the SIM card data such that a wireless client 125 can seamlessly access/retrieve the SIM card data. In addition, SIM card data from the cloud SIM card server 105 may be accessed on a regulated basis via credential access, for example. This regulated basis may be determined, in part, by licenses, privileges, and other levels of authorization dictated by a user's credentials.

A physical SIM card 130 may be inserted in a wireless client 125. In other implementations, the wireless client 125 may contain multiple inserted physical SIM cards 130. One or more cloud SIM cards 132 may be downloaded from cloud SIM card server 105 to one or more wireless clients 125. The one or more cloud SIM cards 132 may operate similarly as a standard physical SIM card providing the wireless clients 125 access to a SIM card operator/wireless operator. In some implementations, the SIM cards 130 may be coupled to one or more wireless clients 125 via one of the wireless connections described herein.

In some embodiments, one or more physical SIM cards 130 may include storage logic for storing data. The one or more physical SIM cards 130 may include a plurality of non-volatile/non-transitory storage media such as solid state storage media and/or the like. According to some embodiments, the one or more physical physical SIM cards 130 may include logic that updates data stored within based on updates issued by the cloud SIM card server 105.

Moreover, each wireless client 125 may include a cloud SIM card control module 142, a network control module 144, and an authentication control module 146, and a switching module 156. The cloud SIM card control module 142 may request the download of the cloud SIM card 132, register the cloud SIM card 132 when necessary, and recycle of the cloud SIM card 132 when it is not needed. In some implementations, when the wireless client 125 may no longer need the cloud SIM card 132, the cloud SIM card information (the MNC, MCC, ICCID, PLMN and other relevant information) is deleted from the wireless client 125.

The network control module 144 may monitor the network status of the two SIM cards 130 in real time by assessing the following network parameters: signal strength, signal quality, access mode, delay and Internet speed, etc., as well as all the current location of the wireless client 125. By analyzing these network parameters, the network control module 144 may determine the network status of the two SIM cards 130 of the wireless client 125, including unregistered status, normal Internet access status, roaming status, and normal standby status, and send the corresponding status to other modules for processing.

In this case, the unregistered state means that the corresponding SIM card has not been successfully registered to the corresponding mobile network. Normal Internet access status means that the SIM card has been registered on the mobile network and set as the SIM card of the default data network. The normal standby state means that the SIM card has been registered on the corresponding carrier network, but is not used as the default data network. It is in the standby state and can be switched to the data network of the SIM card for use at any time. The international roaming state indicates that the wireless client is outside of the home country of the SIM card.

The network control module 144 may monitor SIM cards 130 authentication status indicating that at least one of the SIM cards 130 is required to be authenticated by the network 110 during standby or use. Note after the SIM cards 130 are registered, the network 110 may initiate a regular re-authentication request during its use, during which the SIM cards' network is unavailable until re-authentication is completed. In some embodiments, network control module 144 may monitor other abnormal states under other unknown circumstances.

The authentication module 146 may forward the cloud SIM card authentication request sent by the operator of network 110 to the wireless client 125 to cloud SIM card server 105 using the existing data channel. The cloud SIM card 132 on cloud SIM card server 105 may complete the needed authentication calculation. The calculation result is returned to the wireless client 125, and the wireless client 125 returns the authentication result to the operator of network 110 within a specified time. After successfully completing the authentication process, the cloud card registration is completed, that is, the cloud card is enabled.

The switching module 156 may obtain the network parameters (including signal strength, signal quality, access mode, delay and Internet speed) corresponding to the two SIM cards 130 that are on standby through the network monitoring module 144. When it is determined a specific parameter is lower than the abnormal threshold of the network, the current SIM card acting as a network card whose data network is the default data channel is immediately switched to the data network corresponding to another standby SIM card. Note the SIM card that was the previous network card is on standby.

As previously discussed, the network 110 facilitates communication between the cloud SIM card server 105 and the wireless client 125. The network 110 may also allow different wireless clients 125 to communicate with each other. According to one embodiment, the network 110 may include a plurality of networks. For instance, the network 110 may include any wired/wireless communication network that facilitates communication between the components of the network system 100. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a fiber optics network, a laser-based network, and/or the like.

The wireless client 125 is configured to generate one or more user interfaces for accessing, analyzing, and displaying the SIM card data. The wireless client 125 may also be configured to generate and/or display interfaces that visualize one or more signals derived from one or more sources. According to some implementations, the wireless client 125 may include functionalities and/or enhanced security features that allow a user to securely access and/or securely manage SIM card data and/or manage one or more detected signals. As shown more clearly in the exemplary functional and system diagrams of FIGS. 2A and 2B, the wireless client 125 includes a processing system 202, a memory 204, an I/O system 206, and a communication system 208. The processing system 202, the memory 204, the I/O system 206, and the communication system 208 may include one or more subsystems that perform one or more of the operations described herein. The wireless client 125 may include a number of SIM cards 207. The SIM cards 207 may include one or more physical SIM cards 130, one or more cloud SIM cards 132 stored on wireless client 125, soft SIM card 150, or a combination of all. Additionally, each system of the wireless client 125 may be operatively and/or otherwise communicatively coupled with each other so as to facilitate one or more operations described herein. The wireless client 125 may include general hardware, specifically-purposed hardware, and/or a combination thereof.

Figure 2A:
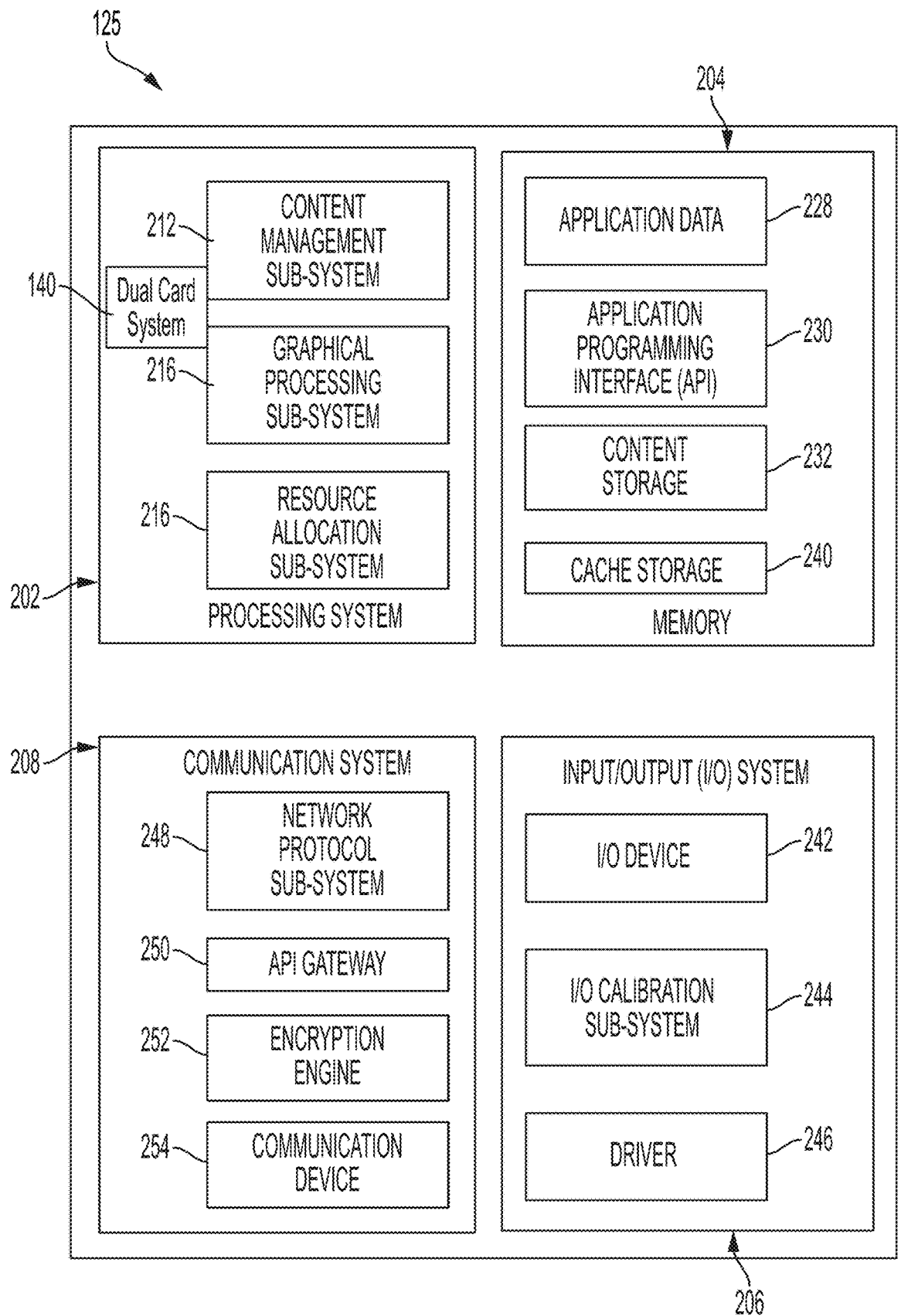
FIG. 2A is a functional block diagram of a computing environment for accessing and visualizing SIM card data, according to one embodiment.
Figure 2B:
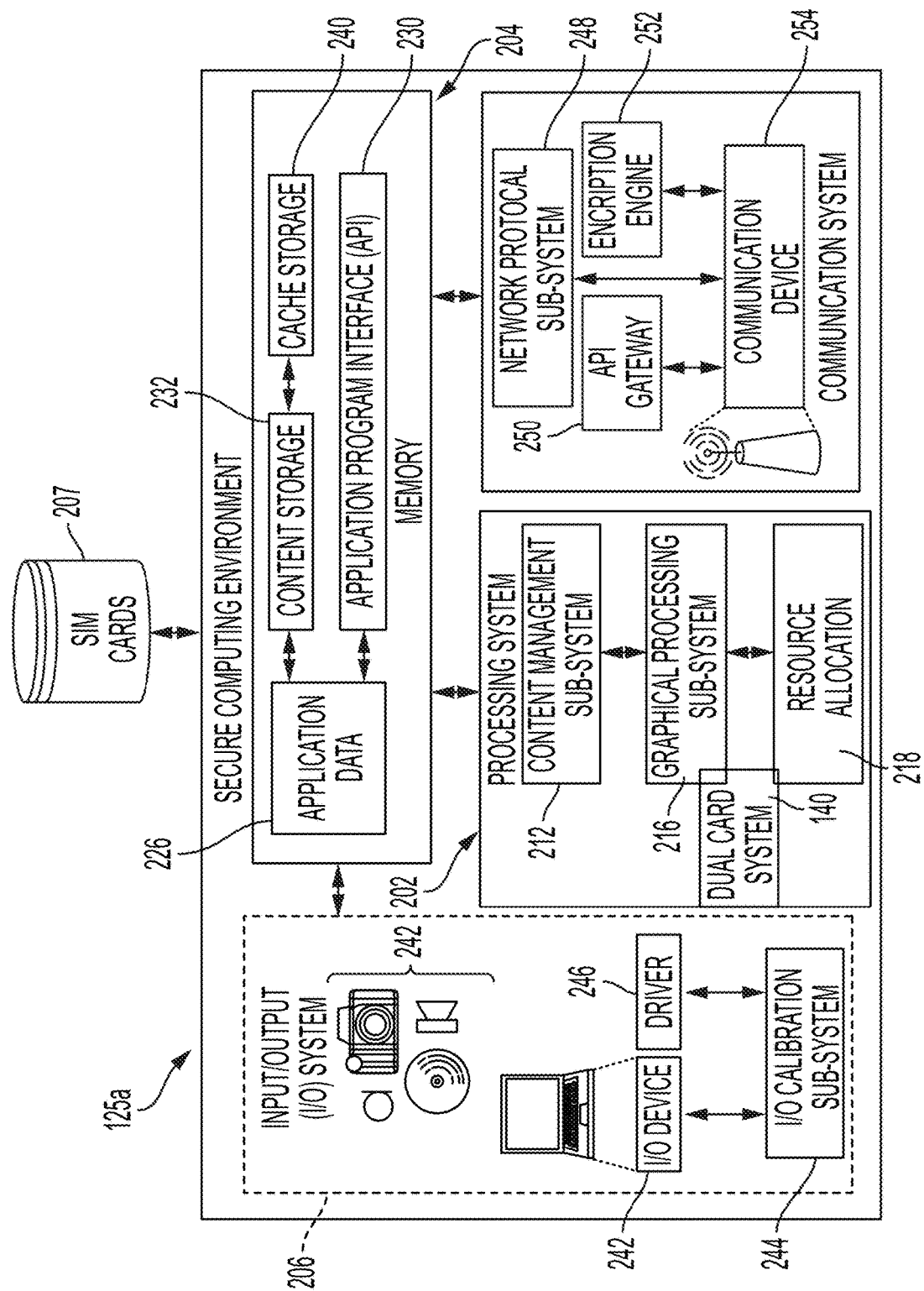
FIG. 2B is a detailed system diagram of FIG. 2A, according to one embodiment.

The processing system 202 may control the memory 204, the I/O system 206, and the communication system 208, as well as any included subsystems, elements, components, devices, and/or functions performed by the memory 204, I/O system 206, and the communication system 208. Additionally, any actions described in this disclosure as being performed by a processor or one or more processors of a computing device or one or more computing device processors and/or one or more computing system processors may be executed by the processing system 202 of FIGS. 2A and 2B. Further, while one processing system 202 is shown in FIGS. 2A and 2B, multiple processing systems may be present and/or otherwise included in the wireless client 125 or elsewhere in the overall network system 100 of FIG. 1. Thus, while instructions may be described as being executed by the processing system 202 (and/or various subsystems of the processing system 202), the instructions may be executed simultaneously, serially, and/or otherwise by one or multiple processing systems 202 on one or more computing devices.

According to one embodiment, the processing system 202 may be implemented as one or more computer processor chips and/or graphical processing unit (GPU) chips and may include a hardware device capable of executing computer instructions. The processing system 202 may execute instructions, codes, computer programs, and/or scripts. The instructions, codes, computer programs, and/or scripts may be received from the I/O system 206, the communication system 208, and/or stored in the memory 204, and/or received from the other subsystems of the wireless client 125 and/or received from other computing environments.

In some embodiments, the processing system 202 may include subsystems such as a content management subsystem 212, a graphical processing subsystem 216, dual card system 140, and a resource allocation subsystem 218. Each of the aforementioned subsystems of the processing system 202 may be communicatively or operably coupled to each other.

The content management sub-system 212 may facilitate generation, modification, analysis, transmission, and/or presentation of content. Content may be file content, media content, SIM card data content, user interfaces, or any combination thereof. In some instances, content on which the content management system 212 operates includes SIM card data from the cloud SIM card server 105, SIM card data from the local repository 130, user interface data, device information, images, text, themes, audio files, video files, documents, and/or the like. Additionally, the content management subsystem 212 may control the audio-visual environment and/or appearance of application data during execution of various processes. In some embodiments, the content management subsystem 212 may interface with a third-party content server and/or third-party memory locations for execution of its operations.

The resource allocation subsystem 218 may facilitate the determination, monitoring, analysis, and/or allocation of computing resources throughout the wireless client 125 and/or other computing environments. Computing resources of the wireless client 125 may be used by the processing system 202, the memory 204, the I/O system 206, and/or the communication system 208. These resources may include processing power, data storage space, network bandwidth, and/or the like. Accordingly, the resource allocation subsystem 218 may include sensors and/or other specially-purposed hardware for monitoring performance of each system and/or subsystem of the wireless client 125, as well as hardware for responding to the computing-resource needs of each system and/or subsystem. In some embodiments, the resource allocation subsystem 218 may use computing resources of a second wireless client separate and distinct from the wireless client 125 to facilitate a desired operation.

As described herein, dual card system 104 may facilitate determination, monitoring, analysis, and/or allocation of SIM cards throughout the wireless client 125. The processing system 202 may store and execute modules 142, 144, 146, and 156 of the dual card system 104 to perform the respective operations described herein.

The memory 204 may be used for storing, recalling, receiving, transmitting, and/or accessing various files and/or data (e.g., SIM card data) and/or signals associated with a product during the operation of the wireless client 125. For example, the memory 204 may store, recall, and/or update SIM card data and/or one or more signals from the cloud SIM card server 105 and/or from the local repository as the case may be. In some embodiments, the memory 204 may store instructions and/or data that may be executed by the processing system 202. For instance, the memory 204 may store instructions that execute operations associated with one or more systems and/or one or more subsystems of the wireless client 125. For example, the memory 204 may store instructions for the processing system 202, the I/O system 206, the communication system 208, and for itself.

Memory 204 may include various types of data storage media such as solid state storage media, hard disk storage media, virtual storage media, and/or the like. Memory 204 may include dedicated hardware elements such as hard drives and/or servers, as well as software elements such as cloud-based storage drives. In some implementations, memory 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing system 202. For example, the instructions stored may be a command, a current operating state of wireless client 125, an intended operating state of wireless client 125, and/or the like. As a further example, data stored in the memory 204 may include instructions related to various methods and/or functionalities described herein. The ROM device may be a non-volatile memory device that may have a smaller memory capacity than the memory capacity of a secondary storage of the wireless client. The ROM device may be used to store instructions and/or data that may be read during execution of computer instructions. In some embodiments, access to both the RAM device and ROM device may be faster to access than access to the secondary storage of the wireless client 125. Secondary storage may comprise one or more disk drives and/or tape drives which may be used for non-volatile/non-transitory storage of data or as an over-flow data storage device of the wireless client 125 if the RAM device is not large enough to hold all working data. Secondary storage may be used to store programs that may be loaded into the RAM device when such programs are selected for execution.

Turning back to FIG. 2A, the memory 204 may include subsystems such as application data 228, application programming interface 230, content storage 232, and cache storage 240. Application data 228 may facilitate deployment, storage, access, execution, and/or utilization of an application utilized by the wireless client 125 and/or any other computing environments described herein. As such, application data 228 may store any information and/or data associated with an application including SIM card data. SIM card data may include physical SIM card data or cloud SIM card data. Application data 228 may further store various pieces of information and/or data associated with the operation of an application and/or with the wireless client 125 as a whole, such as a status of computing resources (e.g., processing power, memory availability, resource utilization, and/or the like), runtime information, user interfaces, systems to direct execution of operations described herein to, user permissions, security credentials, and/or the like.

The application programming interface (API) 230 may facilitate deployment, storage, access, execution, and/or utilization of information associated with APIs of wireless client 125 and/or any other computing environment described herein. For example, wireless client 125 may include one or more APIs for various devices, applications, systems, subsystems, elements, and/or other computing environments to allow communication between one or more applications associated with the wireless client 125. Accordingly, API 230 may include API databases containing information that may be accessed and/or used by applications, systems, subsystems, elements, and/or operating systems of other devices and/or computing environments in communication with the wireless client 125. In some cases, the API 230 may enable the cloud SIM card server 105 and the wireless client 125 to communicate with each other.

The content storage 232 may facilitate deployment, storage, access, and/or utilization of information associated with SIM card data as further discussed below. In one embodiment, content storage 232 may communicate with a content management system 212 to receive and/or transmit content (e.g., SIM card data, media content, etc.).

The I/O system 206 may include hardware and/or software elements for the wireless client 125 to receive, and/or transmit, and/or present information useful for generating one or more interfaces for retrieving and displaying SIM card data according to some embodiments of this disclosure. For example, elements of the I/O system 206 may be used to receive input from a user of the wireless client 125. As described herein, I/O system 206 may include subsystems such as I/O device 242, I/O calibration subsystem 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with wireless client 125. For example, I/O device 242 may include SIM unit 130, a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing system 202 and/or memory 204 to execute operations associated r retrieving and visualizing SIM card data.

The I/O calibration system 244 may facilitate the calibration of SIM cards 207. For example, I/O calibration system 244 may detect and/or determine one or more settings of SIM cards 207, and then adjust and/or modify settings so that SIM cards 207 may operate more efficiently. In some embodiments, I/O calibration system 244 may use a driver 246 (or multiple drivers) to calibrate I/O device 242 as needed. For example, driver 246 may include software that is to be installed by I/O calibration system 244 so that an element of wireless client 125 (or an element of another computing environment) may recognize and/or integrate with SIM cards 207.

The communication system 208 may facilitate establishment, maintenance, monitoring, and/or termination of communications between the wireless client 125 and other computing environments, third-party server systems, and/or the like. Communication system 208 may also facilitate internal communications between various elements (e.g., systems and/or subsystems) of wireless client 125. In some embodiments, communication system 208 may include a network protocol subsystem 248, an API gateway 250, an encryption engine 252, and/or a communication device 254. These systems and/or subsystems of the communication system 208 may be implemented as hardware, software, or a combination thereof.

The network protocol subsystem 248 may facilitate establishment, maintenance, and/or termination of a communication connection for the wireless client 125 via a network (e.g., network 110). For example, network protocol subsystem 248 may detect and/or define a communication protocol required by a particular network and/or network type. Communication protocols utilized by network protocol subsystem 248 may include Wi-Fi protocols, Li-Fi protocols, cellular data network protocols, Bluetooth® protocols, internet protocols, WiMAX protocols, Ethernet protocols, power line communication (PLC) protocols, and/or the like. In some embodiments, facilitation of communication for the wireless client 125 may include transforming and/or translating data from a first communication protocol to a second communication protocol. In some embodiments, network protocol subsystem 248 may determine and/or monitor an amount of data traffic to determine which network protocol is to be used for establishing a secure communication connection, transmitting data, and/or performing retrieval and subsequent visualization of SIM card data.

The dual card system 140 may use the network protocol subsystem 248 to facilitate the operations of the authentication control module 146 described herein to forward the cloud SIM card authentication request sent by the operator of network 110 to the wireless client 125 and to cloud SIM card server 105.

The application programming interface (API) gateway 250 may allow other devices and/or computing environments and/or applications external to the wireless client 125 to access the API 230 of the memory 204. For example, a computing system may access the API 230 of the wireless client 125 via the API gateway 250. In some embodiments, API gateway 250 may be required to validate user credentials associated with a user of a computing device (e.g., a device external to the wireless client 125) prior to providing access to the API 230 to the user. API gateway 250 may include instructions for the wireless client 125 and thereby communicate with external devices and/or between components of the wireless client 125.

The encryption engine 252 may facilitate translation, encryption, encoding, decryption, and/or decoding of information received, transmitted, and/or stored by the wireless client 125. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for wireless client 125 with external systems and/or devices. In some embodiments, communication device 254 may include one or more radio transceivers, chips, analog front end (AFE) units, antennas, processing units, memory, other logic, and/or other components to implement communication protocols (wired or wireless) and related functionality for facilitating communication for WAS system 125. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

To reiterate, in this disclosure, a network card may refer to a SIM structure (one or more physical SIM cards or one or more cloud cards) whose data network may be the default data channel used to provide wireless client 125 wireless service.

A user may activate the dynamic switch of a network card via the provided user interface (UI) at the wireless client 125 to initiate using the cloud SIM cards or physical SIM cards 130 described herein. If it is determined the wireless client 125 has a cloud SIM card 132 or a physical SIM card 130 of a specific network operator, the user may be prompted that the cloud SIM card 132 or physical SIM card is activated for use. If not, the user may be prompted that a cloud SIM card 132 or a physical SIM card 130 of a specific network operator is required.

The user may deactivate the dynamic switch of the network card by removing the SIM card of a specific operator, closing the connection between the cloud SIM card 132 and the cloud SIM card server 105, or deactivating it via the UI.

In some embodiments, a wireless client 125 may activate two or more SIM cards (cloud SIM cards or physical SIM cards) at the same time and attached to different network operators, but just one of the SIM cards may be selected as a network card for data service. When a SIM structure is deactivated, one of other activated SIM cards may be swapped to replace the deactivated SIM card. This is due to the wireless client 125 having a limit number of wireless channels can be activated and ready to be used for data connection. Note whichever SIM structure is used establishes a corresponding network card to provide wireless service to the wireless client.

The following are possible examples of the status of the SIM cards or wireless client 125 described herein: activating a SIM card; starting the SIM card and register the SIM card to the cellular network; loading the SIM card; loading the SIM card into one of the two SIM cards in the wireless client 125; swapping the SIM cards; loading a new SIM card to replace the old SIM card; deactivating the SIM card: stop the SIM card; switching the network card; change the network card from one SIM card's to another SIM card's; attaching the network; connecting to the cellular network register the network; connect to the cellular network; and authenticate.

Figure 3:
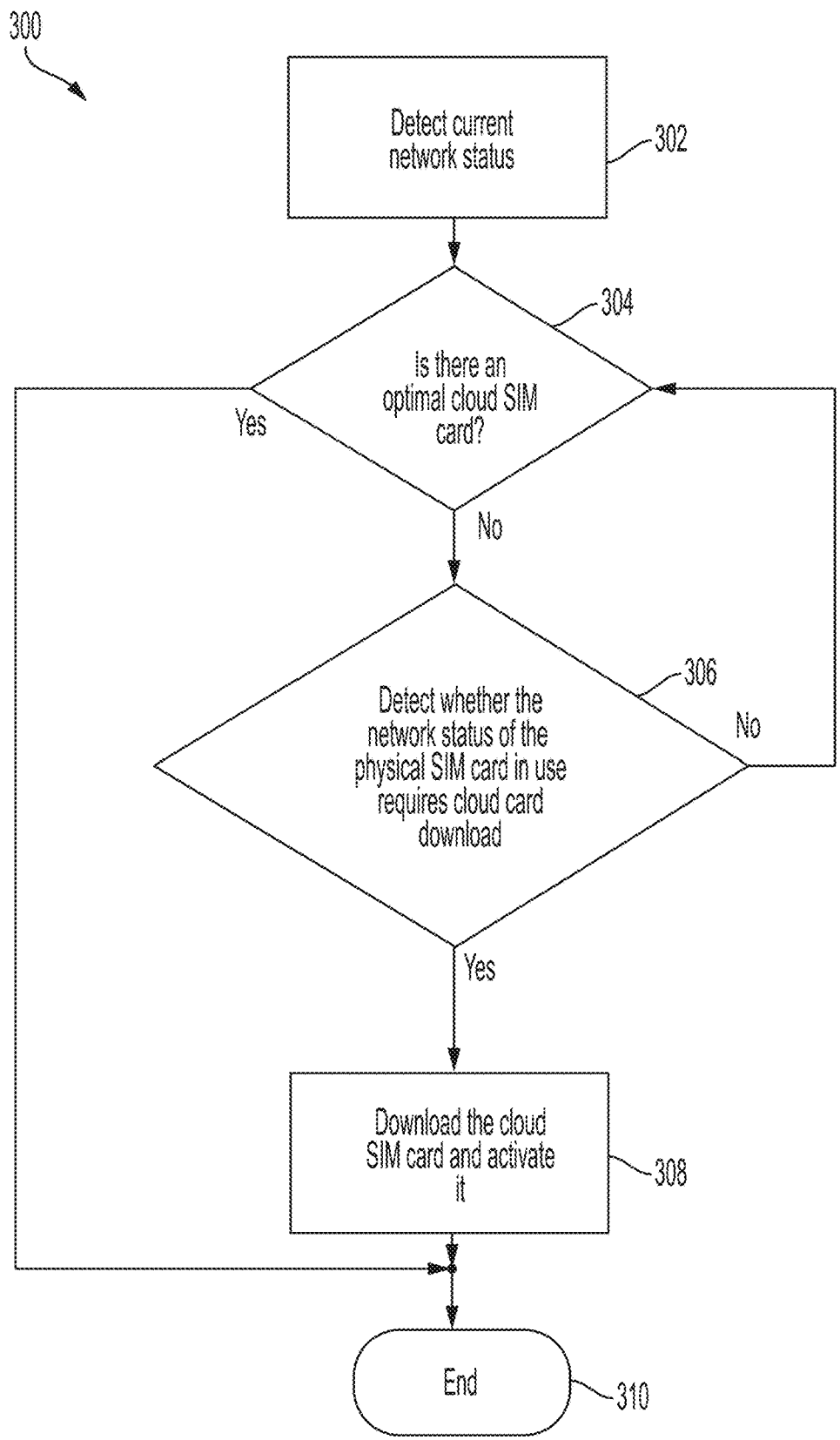
FIG. 3 is an exemplary flowchart illustrating downloading a cloud SIM card locally with a SIM card of a specific operator, in accordance with some embodiments.

FIG. 3 is an exemplary flowchart 300 illustrating downloading a cloud SIM card 132 locally with a SIM card of a specific operator. The wireless client 125 may first detect the network status, including that of the SIM card operator of the physical SIM cards 130 in use and other operators, shown in step 302. The network status may include the signal strength, signal quality, network type, latency, network speed, or other parameters. The wireless client 125 may detect whether there is an optimal cloud SIM card 132 (if the network status of the operator meets the limits for the signal strength, signal quality, network type, latency, and network speed), at step 304. If yes, the flow ends at step 310. If not, the flow goes to step 306. At step 306, the wireless client determines whether the current network status requires cloud SIM card 132 includes the following: download occurs within a set time, the signal strength is weaker than the set threshold, the signal quality is poor, the network type is not the preferred one, the latency is greater than the threshold, the physical SIM card 130 is not capable of downloading a cloud SIM card 132, and/or the network speed is lower than the set threshold. If yes, the wireless client 125 downloads the cloud SIM card 132 and activates it, as shown in step 308. The physical SIM card's status is the key factor in determining whether to download the cloud SIM card(s) 132. The downloaded cloud SIM card 132 has an operator different from that of the physical SIM cards 130 in use. After downloading the cloud SIM card 132, the flow ends at step 310.

It assumed in this case the wireless client 125 is running normally, the wireless client 125 downloads a cloud SIM card 132 from the cloud server and directly activates it if it detects poor network status of the operator.

In some embodiments, there may be additional conditions for downloading the cloud SIM card at step 306 including: (1) when the physical SIM card 130 may be out of service; (2) there is no data connection to download the cloud SIM card, or (4) the wireless client may need to start a seed SIM card 150 to establish a data connection to cloud SIM server. If the physical SIM card is registered, it can use the data connection of the physical SIM card directly and download the cloud SIM card.

In some embodiments, a cloud SIM card 132 may be replaced when the cloud SIM card 132 downloaded is not the optimal one (with signal strength weaker than the set threshold). In this scenario, an interruption will be triggered, and the wireless client 125 will download another cloud SIM card 132 of a different operator from the server.

In some embodiments, multiple cloud SIM cards 132 may be downloaded at the same time. The wireless client 125 may start polling cloud SIM cards 132 existing on the server and, if there is an optimal one among them, may maintain the optimal cloud SIM card registered. Otherwise, wireless client 125 may continue to search for another cloud SIM card 132 on the server. In some embodiments, the multiple cloud SIM cards 132 may include different operators or be subject to the configuration strategy of the cloud SIM card server 105.

Figure 4:
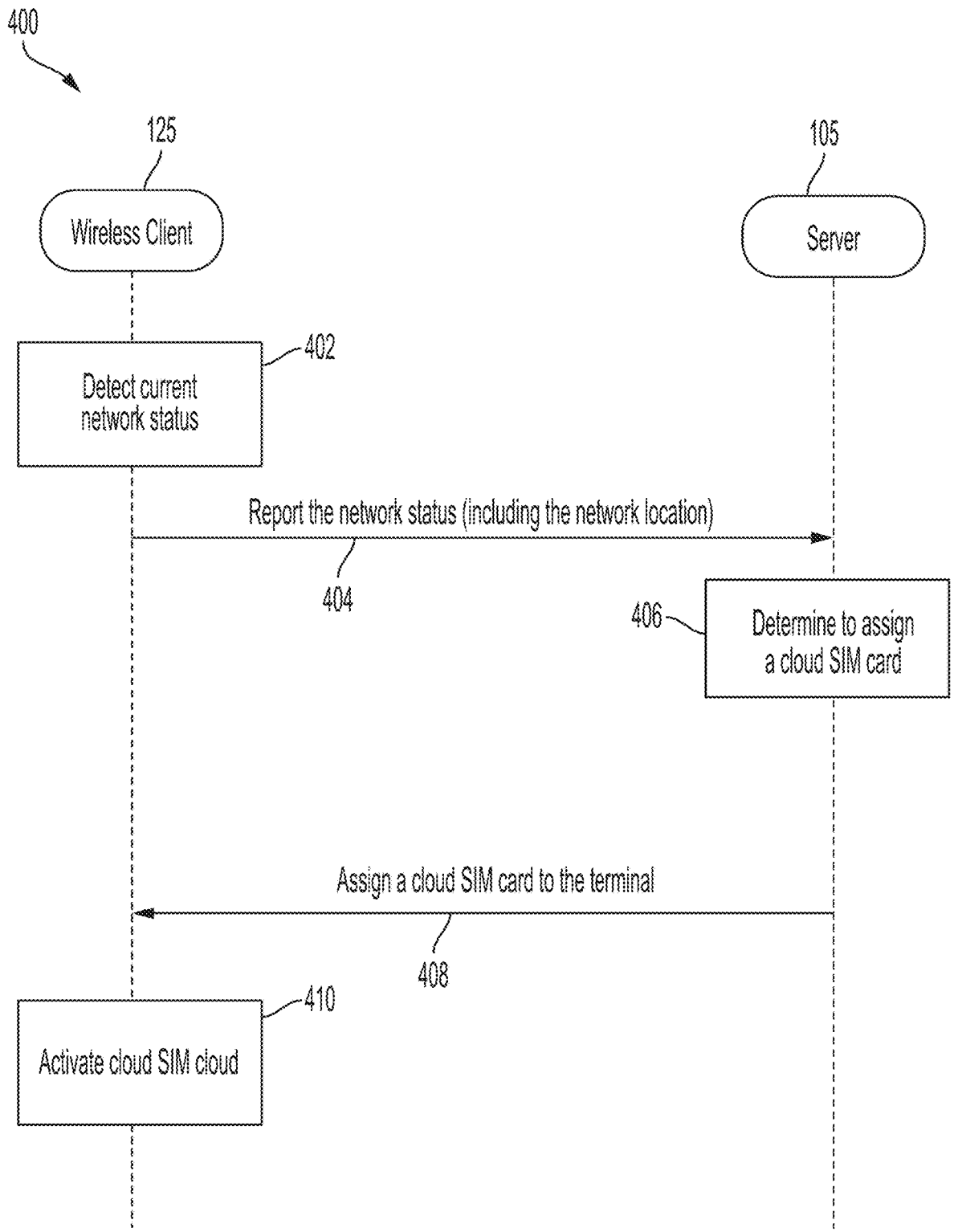
FIG. 4 is an exemplary flow chart illustrating a cloud SIM card server actively assigning a cloud SIM card to a wireless client, in accordance with some embodiments.

FIG. 4 is an exemplary flow 400 chart illustrating cloud SIM card server 105 actively assigning a cloud SIM card 132 to wireless client 125. The wireless client 125 may detect the current network status 402 and may report it to the cloud SIM card server 105 including the network location information, as shown in step 404. The cloud SIM card server 105 may determine whether it is necessary to assign a cloud SIM card 132 to the wireless client 125 after analyzing the use records of specific SIM card operators at the location (including records of dynamic network card switches, signal strength, signal quality, network type, latency, and speed), as shown in step 406. The server 105 may also preset the assigning of cloud SIM cards of other specific operators at a specific network location.

If the cloud SIM card server 105 determines that it is necessary to assign a cloud SIM card, it assigns a cloud SIM card 132 to the wireless client 125, as shown in step 408. It gives priority to cloud SIM cards 132 of operators different from that of the current network. The wireless client 125 may receive the cloud SIM card 132 assigned by the server 105 and activate it without switching network cards, as shown in step 410. Note cloud SIM card server 105 communicates with cloud SIM card control module 142 in assigning the cloud SIM cards 132 to wireless client 125.

Figure 5:
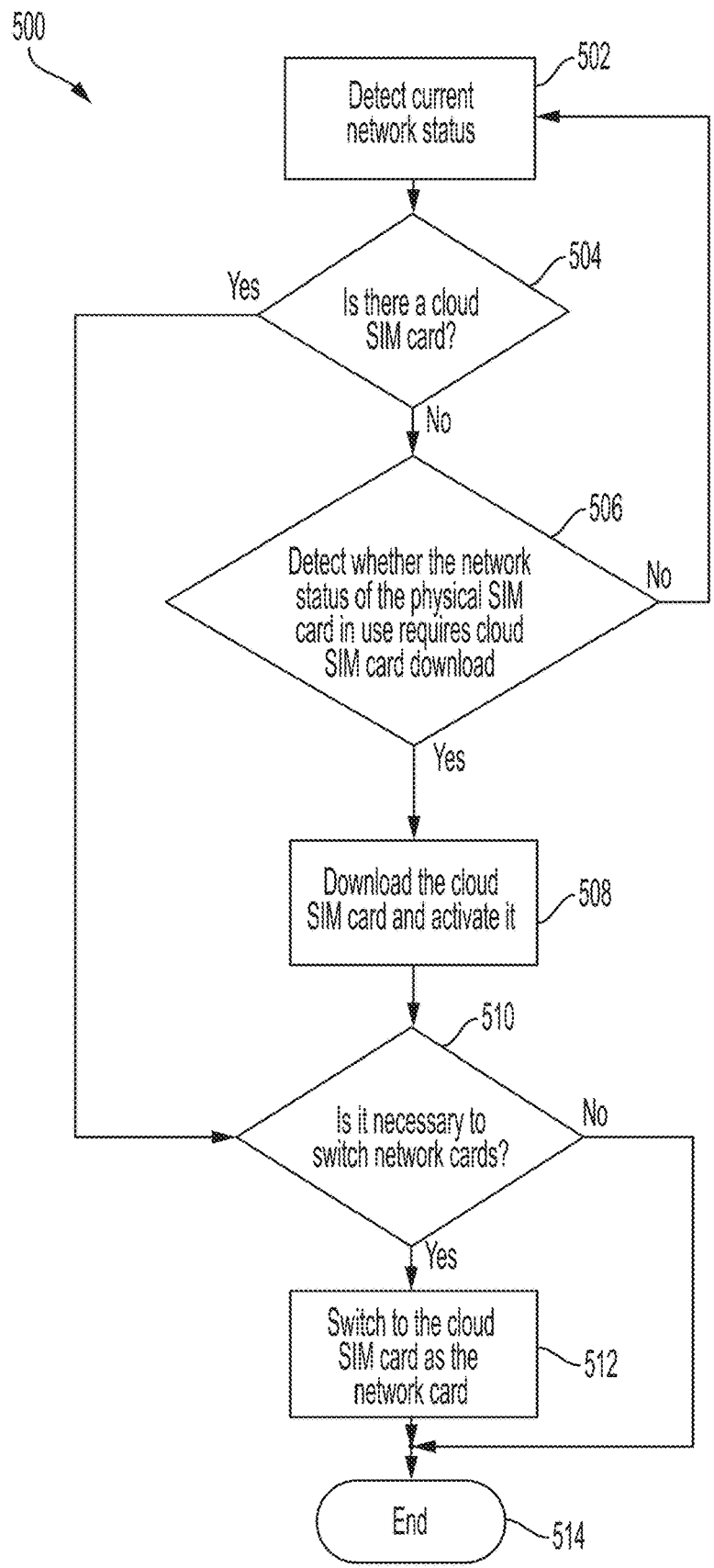
FIG. 5 is an exemplary flowchart illustrating a wireless client dynamically switching a network card from a physical SIM card to a cloud SIM card, in accordance with some embodiments.

FIG. 5 is an exemplary flowchart 500 illustrating a wireless client dynamically switching a network card from a physical SIM card 130 to a cloud SIM card 132. The wireless client 125 may detect the current network status, including that of the operator of the physical SIM card 130 in use and other operators, as shown in step 502. Afterward, the wireless client 125 may determine whether there is a cloud SIM card 132, as shown in step 504. If yes, the flow goes to step 510. If not, the flow goes to step 506. At step 506, the wireless client may detect whether the network status of the physical SIM card 130 in use requires cloud SIM card download. In some embodiments, the wireless client 125 may detect the network status of the physical SIM card 130 by determining if downloads occur within the set time, the signal strength of the physical SIM card 130 in use is weaker than the threshold; the signal quality is poorer than the threshold; the network type is not the preferred one; the latency is longer than the threshold; the physical SIM card 130 is not able to download a client SIM card; and/or the network speed is slower than the threshold. When the physical SIM cards is unable to download a cloud SIM card 132, it may activate soft SIM card 150 to download the cloud SIM card. The physical SIM card's status is the key factor in determining whether to download the cloud SIM card(s) 132. In some embodiments, network speed may be determined by assessing the cloud SIM card download and switching network card switch have different thresholds for the signal strength, signal quality, latency, network speed, and preferred/non-preferred network type. If it is necessary to download a cloud SIM card, the flow goes to step 508. Otherwise, the flow repeat step 502.

At step 508, a cloud SIM card 132 is downloaded and activated at the wireless client 125. Afterwards, wireless client 125 determines if it is necessary to switch network cards according to the same conditions in step 506, as shown in step 510. In particular, the wireless client 125 may switch network cards by determining if downloads occur within the set time; the signal strength of the physical SIM card 130 in use is weaker than the threshold; the signal quality is poorer than the threshold; the network type is not the preferred one; the latency is longer than the threshold; the physical SIM card 130 is not able to download a client SIM card; and/or the network speed is slower than the threshold. If yes, the flow goes to step 512. If no, the flow ends at step 514. The physical SIM card's status is the key factor in determining whether to download the cloud SIM card(s) 132. At step 512, the wireless client 125 switches network cards by setting the default SIM card to be the downloaded cloud SIM card 132 in the wireless client 125 that accesses the network. Afterwards, the flow ends at step 514.

Figure 6:
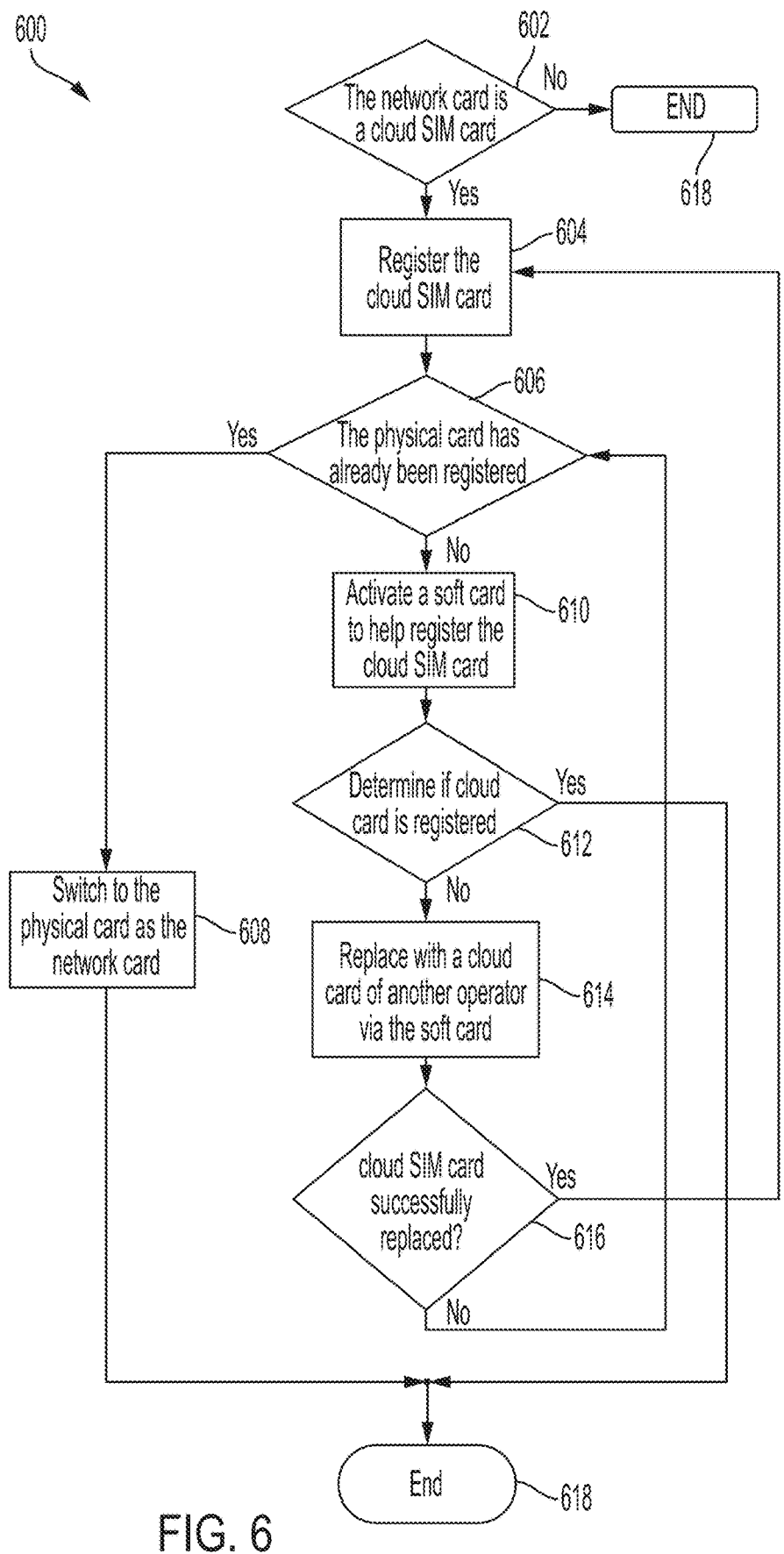
FIG. 6 is an exemplary flowchart illustrating handling network and registration failure of a cloud SIM card at a wireless client, in accordance with some embodiments.

FIG. 6 is an exemplary flowchart 600 illustrating handling network and registration failure of a cloud SIM card 132 at a wireless client 125. At step 602, it is determined the network card is a cloud card 132. In response to determining the network card is the cloud SIM card 132, the cloud SIM card 132 may be registered or re-registered due to network failure as it is replaced with a new cloud SIM card 132, as shown in step 604. Otherwise, the flow ends at step 618. The wireless client 125 may determine whether the physical SIM card 130 is registered, as shown in step 606. If yes, the flow proceeds to step 608 where the physical SIM card 130 is chosen as the network card and ends the flow at step 618. If not, the flow goes to step 610. At step 610, the wireless client 125 may activate a soft SIM card 150 to help register the cloud SIM card 132. The wireless client 125 may determine whether the cloud SIM card 132 is successfully registered, as shown in step 612. If yes, the flow ends at step 618. If not, the flow goes to step 614. At step 614, the wireless client 125 may replace the current cloud SIM card 132 by downloading a new cloud SIM card 132 from server 105 of another operator, which is different from the previous cloud SIM card, through a soft SIM card 150. Afterward, if the current cloud SIM card 132 is successfully replaced with the new cloud SIM card 132 of another operator at step 616, the flow repeats step 604, otherwise, step 606 is repeated.

Figure 7:
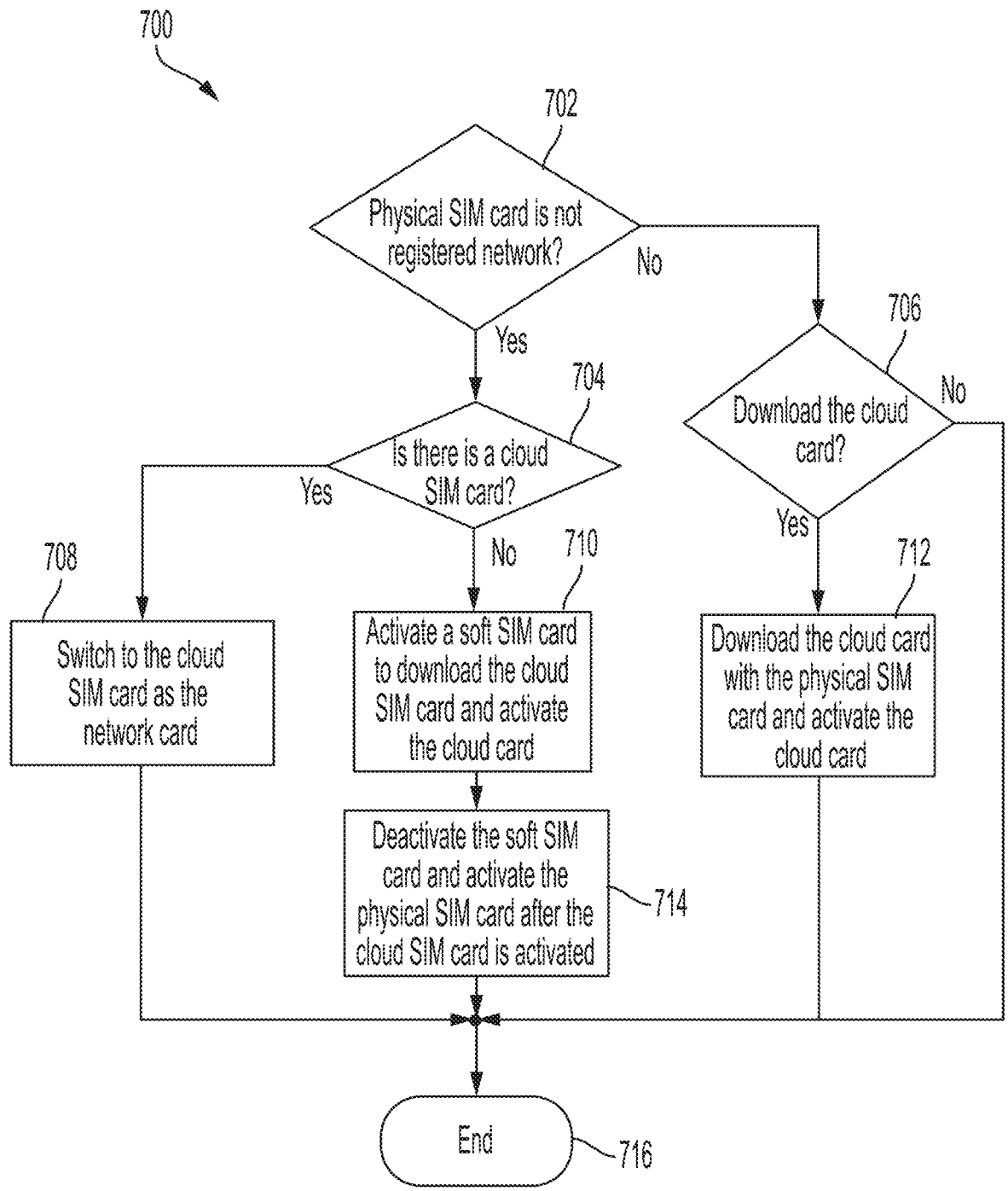
FIG. 7 is an exemplary flowchart illustrating handling of network failure or network registration failure after booting of the physical SIM card at a wireless client, in accordance with some embodiments.

FIG. 7 is an exemplary flowchart 700 illustrating handling of network failure or network registration failure after booting of the physical SIM card 130 at a wireless client 125. At step 702, it is determined if the physical SIM card 130 fails to access the network or fails to be registered within a set time after booting. If yes, the wireless client 125 may determine whether there is a cloud SIM card 132 otherwise at step 704, otherwise if the physical card is registered, the wireless client 125 may determine whether it meets the threshold for cloud SIM card 132 download at step 706. At step 708, if it is determined the wireless client 125 includes a cloud SIM card 132 when the physical SIM card 130 is not registered, the wireless client 125 may switch to the cloud SIM card 132 as the network card, and ends the flow at step 716. Otherwise, the wireless client 125 may activate the soft SIM card 150 to download a cloud SIM card 132, as show in step 710. After the cloud SIM card 132 is activated, the wireless client 125 may deactivate the soft SIM card 150 and activate the physical SIM card 130, as shown in step 714. Afterwards, the flow ends at step 716.

At step 712, it is determined the wireless client 125 may meet the threshold for cloud SIM card download using the same approaches described in FIGS. 3 and 5-6, and downloads the cloud SIM card 132 using the data connection of the physical card, activates the cloud SIM card 132, and ends the flow at step 714. Otherwise, the wireless client 125 does not meet the threshold for cloud SIM card download, and ends the flow at step 716

Figure 8:
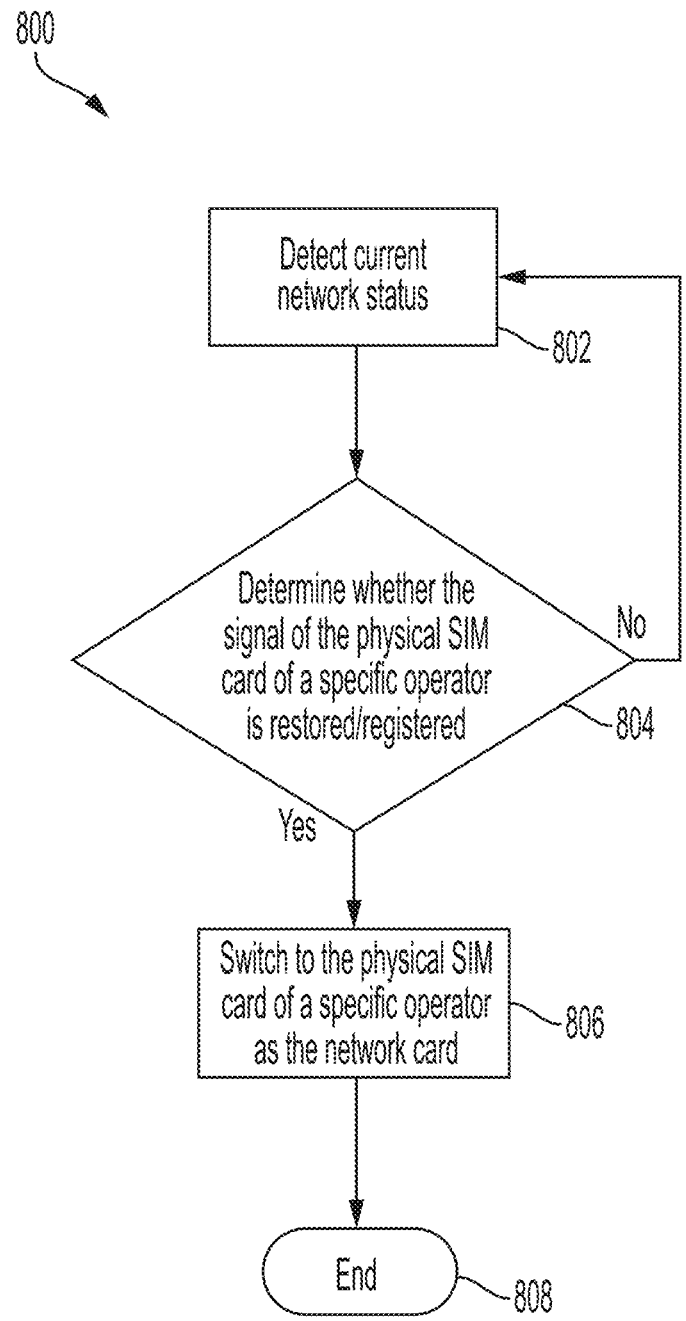
FIG. 8 is an exemplary flowchart illustrating a wireless client switching from a cloud SIM card to a local physical SIM card of a specific operator when the local signal quality is restored, in accordance with some embodiments.

FIG. 8 is an exemplary flowchart 800 illustrating a wireless client 125 switching from its network card from a cloud SIM card 132 or dual cloud SIM card to a local physical SIM card 130 of a specific operator when the local signal quality is restored. In this scenario, the local signal quality of the physical SIM card 130 is poor in a region, and a cloud SIM card 132 or dual cloud SIM cards (two cloud SIM cards 132) may be temporally used to improve the signal quality in the region. Once the signal quality improves for the physical SIM card 130, the physical SIM card 130 is restored as the network card. At step 802, the wireless client 125 may detect the current network status using similar techniques described in FIGS. 3-4. Also, the wireless client 125 may determine whether the network of the operator of the physical SIM card 130 is restored or registered including roaming (activated) and non-roaming, as shown in step 804.

In some implementations, there may be two cases when the network card is switched from the physical SIM card to one cloud SIM card 132 or dual cloud SIM cards. The first is the case where the wireless client 125 is located in areas where the physical SIM card 130 is fully operational, such as the designated country of origin of the physical SIM card or roam able country. In this case, the network card may be switched from the physical SIM card to the single cloud SIM card from one or more cloud SIM cards, and try to use the physical SIM card as best as possible. This may include dual cloud SIM cards from two or more cloud SIM cards. The second is the case when the wireless client is out of the physical SIM card's designated areas, the network card may be switched from the physical SIM card to the dual cloud SIM cards.

If it is determined the network of the operator of the physical SIM card 130 is restored or registered, the wireless client 125 may switch the physical SIM card 130 of a specific operator as the network card at step 806 and the flow ends at step 808. If it is determined the network of the operator of the physical SIM card 130 is not restored or registered, step 802 is repeated.

In some embodiments, the physical SIM card 130 may be restored if the signal strength and signal quality meet the set threshold and the network type is the preferred one.

In some implementations, if the switch (the physical SIM card 130 to the cloud SIM card 132) is because of latency or network speed, a time limit should be set as one of the restoration conditions (i.e., the network card of the wireless client 125 should switch to the physical SIM card 130 if the latency or network speed is restored for a set time, but such a time limit should only be imposed on the network location that the former physical SIM card 130 is in).

Figure 9:
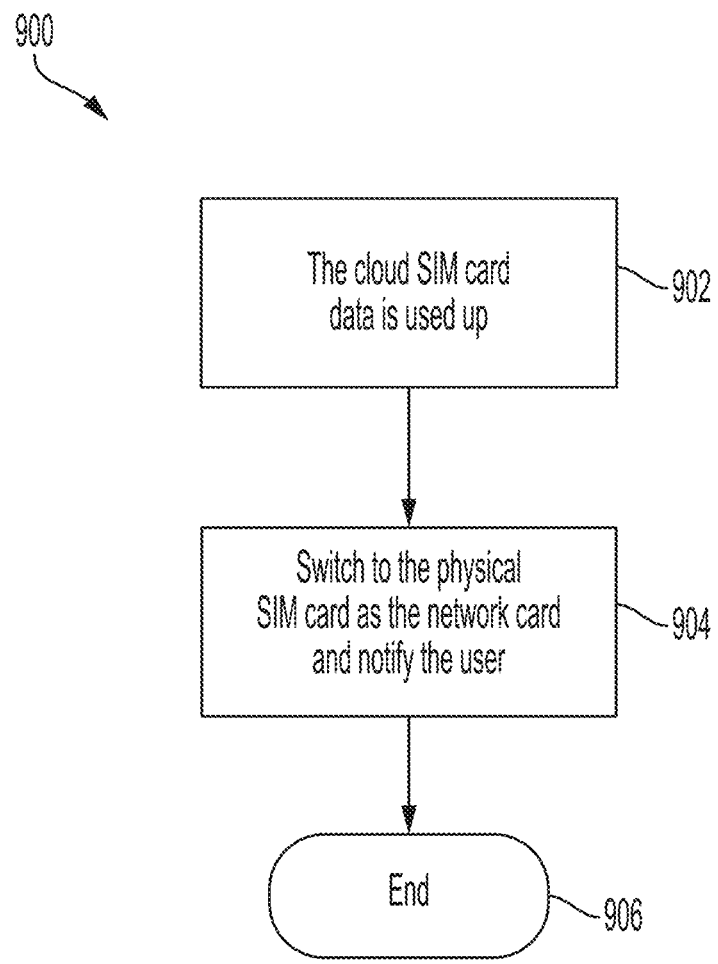
FIG. 9 is an exemplary flowchart illustrating a wireless client switching from a cloud SIM card to a local physical SIM card of a specific operator when the cloud SIM card data is depleted, in accordance with some embodiments.

FIG. 9 is an exemplary flowchart 900 illustrating a wireless client 125 switching from a cloud SIM card 132 to a local physical SIM card 130 of a specific operator when the cloud SIM card 132 data is depleted. In this case, the cloud SIM card 132 is inoperable due to the data limits allotted to the cloud SIM card 132 being surpassed, as shown in step 902. Once this occurs, the wireless client 125 may switch to the physical SIM card 130 as the network card and notifies the user that the cloud SIM card 132 data has been depleted at step 904, and ends the flow at step 906.

Figure 10:
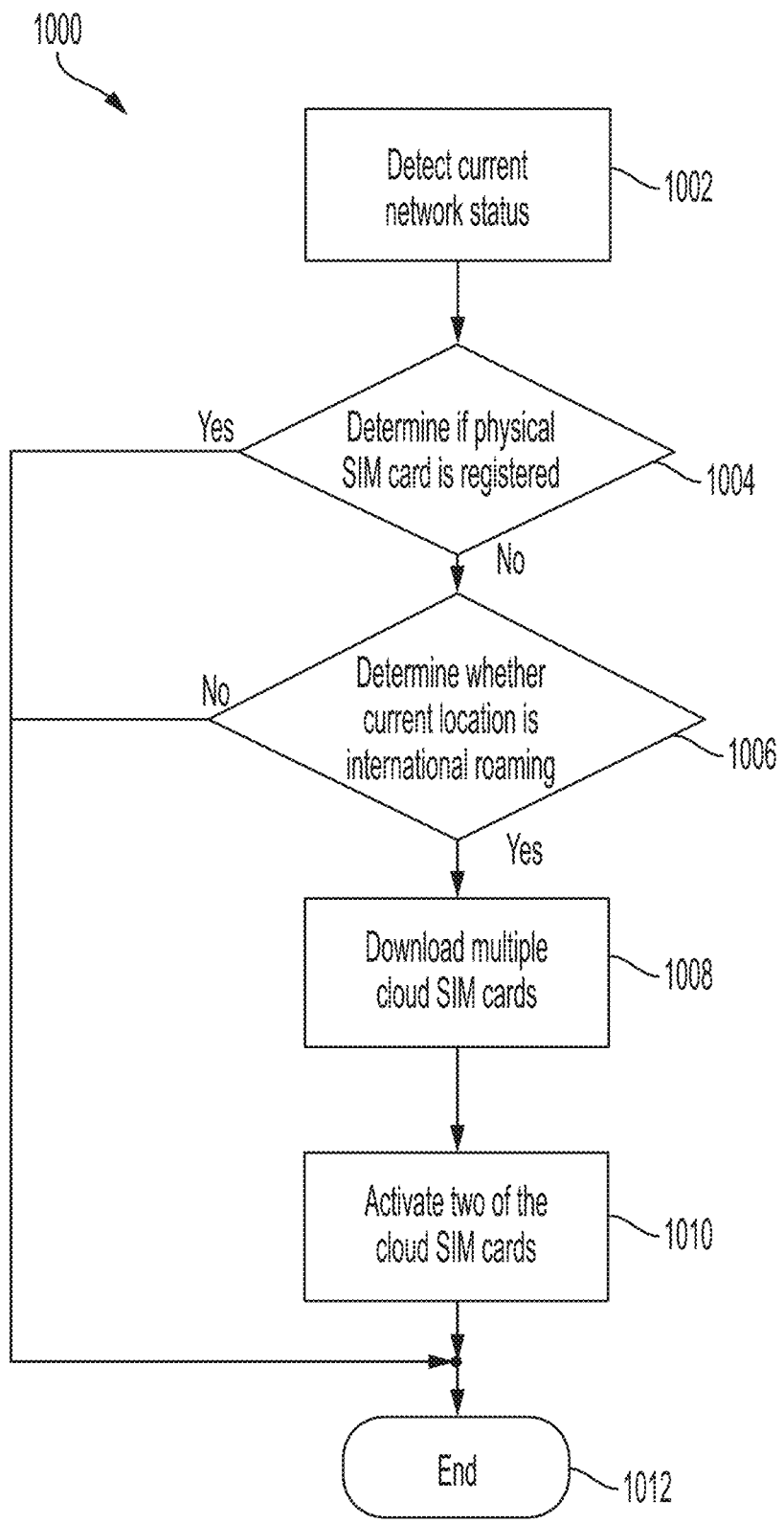
FIG. 10 is an exemplary flowchart illustrating a wireless client switching from a physical SIM card to dual cloud SIM cards when the wireless client is roaming internationally and the physical SIM card is not registered, in accordance with some embodiments.

FIG. 10 is an exemplary flowchart 1000 illustrating a wireless client 125 switching from a physical SIM card 130 to dual cloud SIM cards when wireless client 125 is roaming internationally and the physical SIM card 130 is not registered. At step 1002, the wireless client 125 may detect the current network status using similar techniques described in FIGS. 3-4. This may include acquiring the mobile country code (MCC) of the wireless client 125. Afterwards, a determination may be made as to whether a physical SIM card 130, acting as the network card, may be registered with a network operator, at decision block 1004. In response to determining the physical SIM card 130 is registered, the process may end, as shown at block 1012. In response to determining the physical SIM is not registered, the wireless client 125 may determine if its current location is international roaming by comparing the current location of the physical SIM card and the MCC of the wireless client 125 at decision block 1006. If the current location of wireless client 125 is not international roaming, the process may proceed to end, as shown at block 1012. Otherwise, wireless client 125 may download multiple cloud SIM cards 132 of different operators using soft SIM card 150, as shown at block 1008. At block 1010, wireless client 125 may activate two of the downloaded cloud SIM cards based on signal levels or other criteria. Subsequently, the process may end at block 1012.

Figure 11:
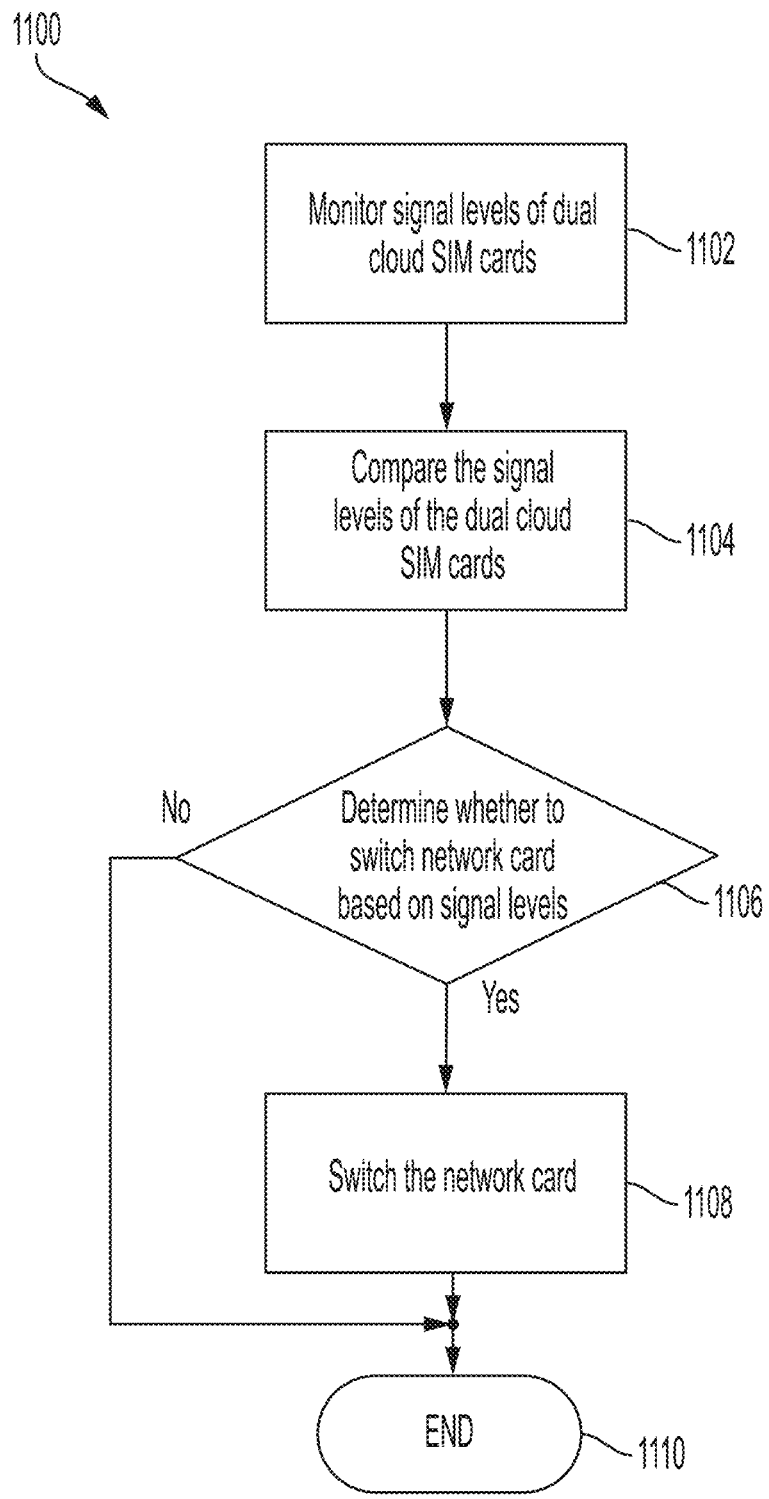
FIG. 11 is an exemplary flowchart illustrating a wireless client switching between two cloud SIM cards/dual cloud SIM cards when the wireless client is roaming internationally and the physical SIM card 130 is not registered, in accordance with some embodiments.

FIG. 11 is an exemplary flowchart 1100 illustrating a wireless client 125 switching between two cloud SIM cards/dual cloud SIM cards when wireless client 125 is roaming internationally and the physical SIM card 130 is not registered. In this case, one of the dual cloud SIM cards may be a network card for providing service using a network operator and the other cloud SIM card is on standby. At block 1102, the wireless client 125 may monitor the signal level of the dual cloud SIM cards. In some implementations, wireless client 125 may define the signal levels as follow:
 −128 dB<SIGNAL LEVEL<−118 dB (POOR)
 −118 dB<SIGNAL LEVEL<−108 dB (Moderate)
 −108 dB<S SIGNAL LEVEL<−98 dB (GOOD)
 −98 dB<SIGNAL LEVEL (GREAT).
Note the boundaries defining the signal levels may be adjustable depending on environment and other factors. In some implementations, wireless client 125 may monitor the signal level of the dual cloud SIM cards in a loop. If the signal level changes for the cloud SIM cards, this process may be triggered once.

At block 1104, the wireless client 125 may compare the signal level of dual cloud SIM cards. Moreover, the wireless client may determine whether to switch the network card according to the comparison of the dual cloud SIM cards' signal levels, as shown at block 1106. In response to determining the network card needs to be switched, the network card may be switched to the cloud SIM card on standby if this cloud SIM card has a stronger signal level than the cloud SIM card currently operating as the network card, as shown at step 1108. Afterward, the process may end at block 1110.

This disclosure presents a technique for authenticating dual cloud SIM cards while reducing roaming data used by a soft SIM card 150 to reduce expenses. Both the dual cloud SIM cards and cloud SIM card authentication are implemented on the cloud SIM card server 105 using the dual card system 140, and downloading the dual cloud SIM cards requires a soft SIM card 150 to use its data service to transmit data between the wireless client 125 and the cloud SIM card server 105, which consumes the soft SIM card 150's data. Dual cloud SIM cards may minimize a wireless client 125 from ever being without access to a network, since each of the dual cloud SIM cards 132 are associated with different operators. The dual card system 140 uses the authentication module 146 to perform the authentication techniques described in FIGS. 12-15.

Figure 12:
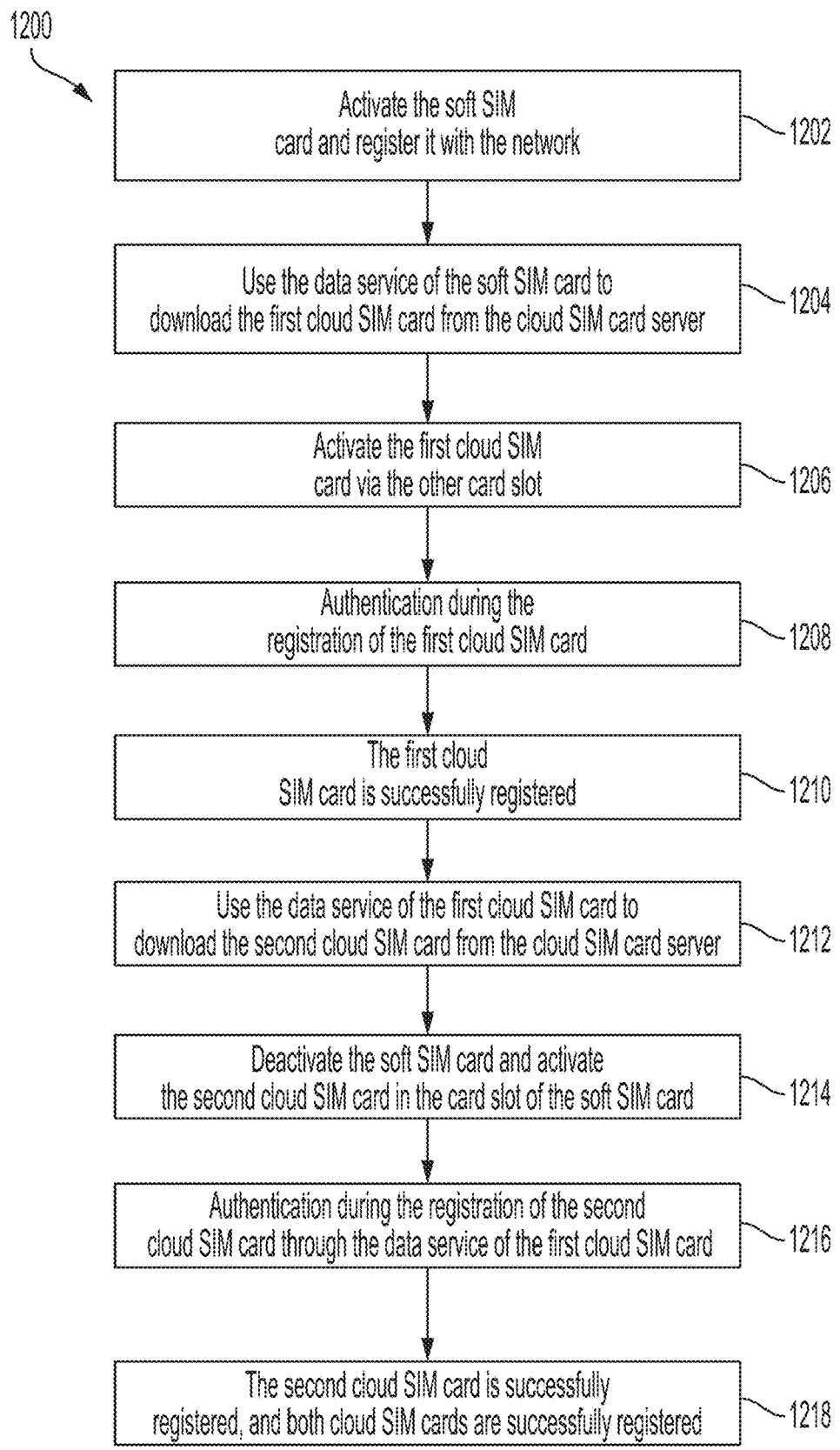
FIG. 12 is an exemplary flowchart illustrating the registration process of dual cloud SIM cards, in accordance with some embodiments.

FIG. 12 is an exemplary flowchart 1200 illustrating the registration process of dual cloud SIM cards. Upon booting, a wireless client 125 activates the soft SIM card 150 automatically, or manually, as shown in step 1202. The wireless client 125 then performs its authentication locally and automatically registers the soft SIM card 150 to the network once it is activated and a network is detected. As shown in step 1204, the wireless client 125 uses the data service of the soft SIM card 150 to request the first cloud SIM card 132 from the cloud SIM card server and download the related data (e.g., ICCID and IMSI) to the wireless client. At step 1206, the first cloud SIM card is activated.

When the first cloud SIM card 132 is being registered, an authentication request will be made from the network to request the wireless client 125 to calculate an authentication result by the authentication algorithm and send it to the network, as shown in step 1208. The authentication ends if such an authentication result is in line with that expected by the network. The authentication of cloud SIM cards may be performed in the cloud SIM card server, so the data service of the soft SIM card 150 can be used to send the authentication request made from the network to the cloud SIM card server. The cloud SIM card server 105 may calculate an authentication result by the authentication algorithm and returns such a result to the wireless client 125 using the data service of the soft SIM card 150. The wireless client 125 may return the authentication result to the network. The authentication ends if such an authentication result is in line with that expected by the network.

After the authentication ends, the cloud SIM card 132 may be successfully registered to the network, as shown in step 1210. Once the first cloud SIM card 132 is successfully registered, the wireless client 125 may no longer use the data service of the soft SIM card 150. Instead, it uses the data service of the first cloud SIM card 132 to download the second cloud SIM card 132 from the cloud SIM card server 105, as shown in step 1212.

At step 1214, the soft SIM card 150 may be removed by software, and the second cloud SIM card 132 may be activated, which is equivalent to removing the soft SIM card 150 and inserting the second cloud SIM card, and the second cloud SIM card 132 may be used in the card slot of the soft SIM card 150. When the second cloud SIM card 132 is being registered, an authentication request will be made from the network for the second cloud SIM card 132, as shown in step 1216. The wireless client 125 may use the data service of the first cloud SIM card 132 to send the authentication request to the cloud SIM card server 105. The cloud SIM card server 105 may calculate an authentication result by the authentication algorithm and send it back to the wireless client 125 using the data service of the first cloud SIM card 132. The wireless client 125 may then return the authentication result to the network. The authentication ends if such an authentication result is in line with that expected by the network.

After the authentication of the second cloud SIM card 132, the second cloud SIM card 132 may be successfully registered to the network, as shown in step 1218. At that point, both cloud SIM cards are successfully registered.

Figure 13:
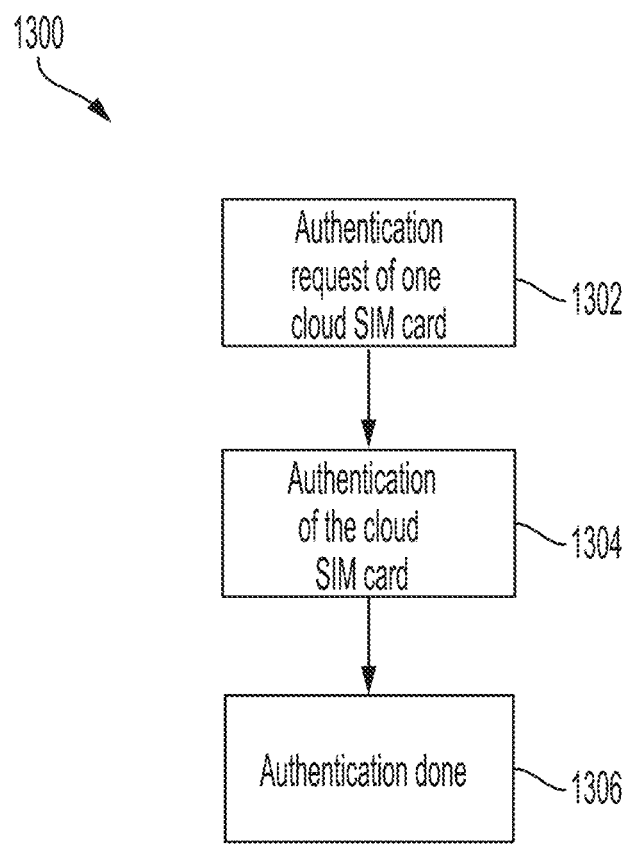
FIG. 13 is an exemplary flowchart illustrating the authentication of one cloud SIM card during use, in accordance with some embodiments.

FIG. 13 is an exemplary flowchart 1100 illustrating the authentication of one cloud SIM card during use. During normal use, an authentication request of any one of the cloud SIM cards 132 may be made, as shown in step 1302. Where there is a location update and a service request is made to the network, the network may make an authentication request. The authentication request is sent to the cloud SIM card server 105 using the data service of another cloud SIM card 132. The cloud SIM card server 105 may calculate an authentication result to authenticate the cloud SIM card using an authentication algorithm, as shown in step 1304. The cloud server 105 may sends the authentication result to the wireless client 125. The wireless client 125 may return such a result to the network. At step 1306, the authentication may be successfully done if the authentication result is in line with that expected by the network.

Figure 14:
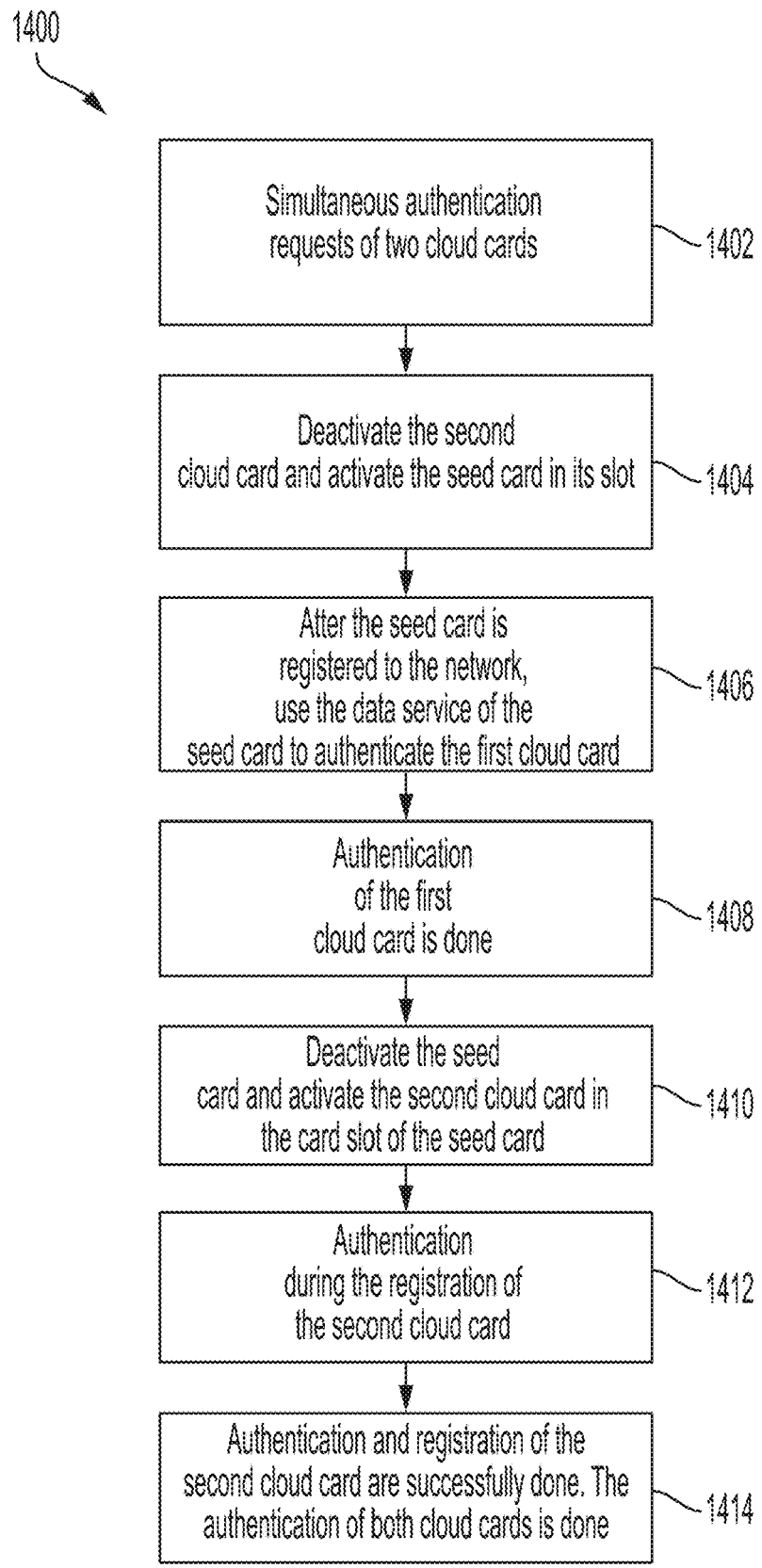
FIG. 14 is an exemplary flowchart illustrating the simultaneous authentication requests of two cloud SIM cards, in accordance with some embodiments.

FIG. 14 is an exemplary flowchart 1400 illustrating the simultaneous authentication requests of two cloud SIM cards 132. At step 1402, simultaneous authentication request of two cloud SIM cards 132 has been issued. This scenario involves the circumstance where the authentication request of the other cloud SIM card 132 is made when the authentication of the first cloud SIM card 132 is not done. At step 1404, the second cloud SIM card 132 is deactivated, and a soft SIM card 150 is activated in its card slot. At step 1406, the data service of the soft SIM card 150 may be used for the authentication of the first cloud SIM card 132 after the soft SIM card 150 is registered to the network. After the soft SIM card 150 is registered to the network, the wireless client 125 may send the authentication request made from the network to the cloud SIM card server 105 using the data service of the soft SIM card 150. The cloud SIM card server 105 may calculate an authentication result using an authentication algorithm, and send the authentication result to the wireless client 125 using the data service of the soft SIM card 150. The wireless client 125 may return the authentication result to the network.

At step 1408, authentication of the first cloud SIM card ends if the authentication result is in line with that expected by the network. The soft SIM card 150 may be deactivated and the second cloud SIM card may be activated at its card slot, as shown in step 1410. During the registration of the second cloud SIM card 132, the wireless client sends the authentication request made from the network to the cloud SIM card server 105 using the data service of the first cloud SIM card 132, as shown in step 1412. The cloud SIM card server 105 may calculate an authentication result by the authentication algorithm and sends the authentication result to the wireless client 125 using the data service of the first cloud SIM card 132. The wireless client 125 may return the result to the network. At step 1414, authentication of dual cloud SIM cards ends after the authentication and registration of the second cloud SIM card 132 is successfully done. The authentication of the second cloud SIM card 132 ends once the authentication result is in line with that expected by the network, after which, the second cloud SIM card 132 will be successfully registered to the network. At that point, the authentication of dual cloud SIM cards ends.

Figure 15:
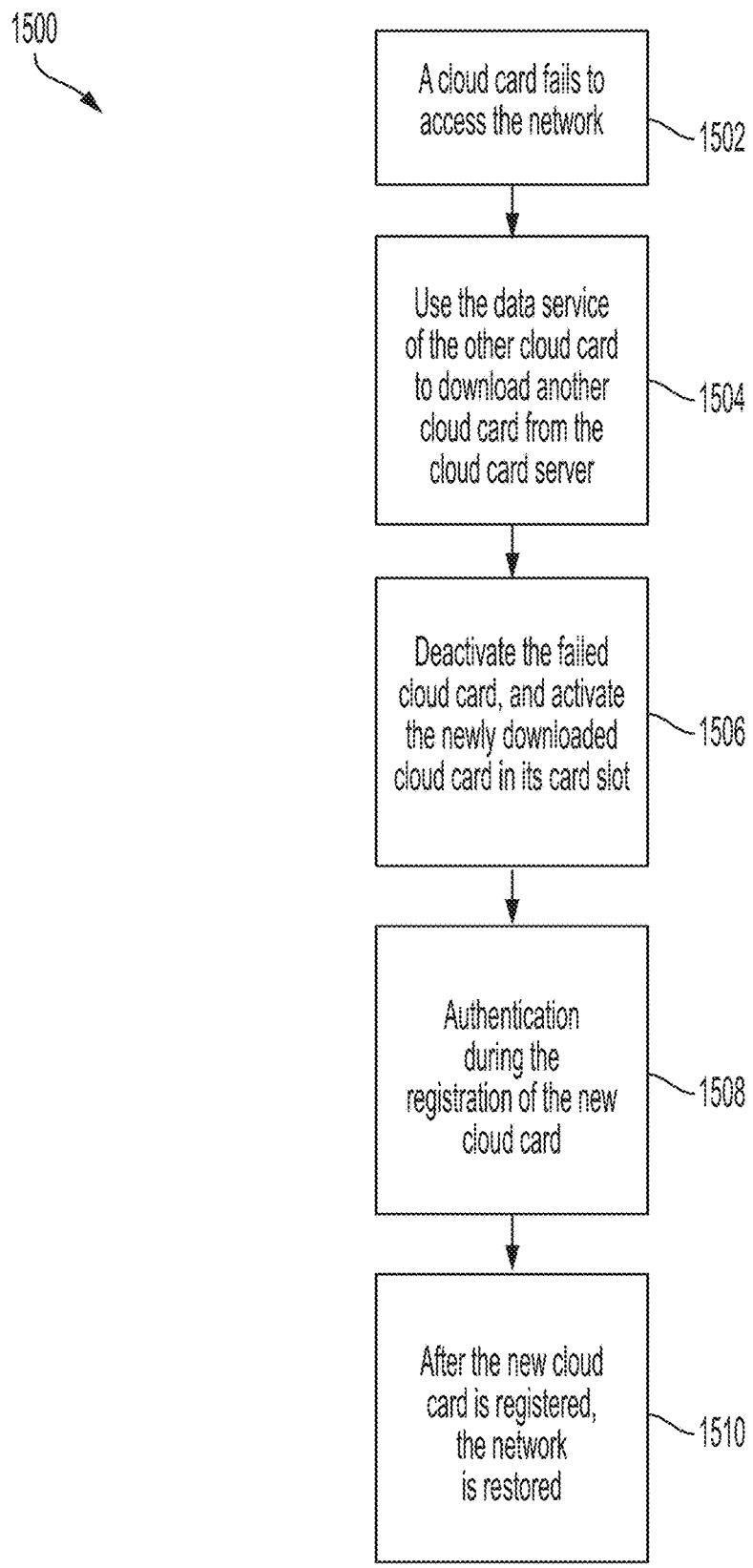
FIG. 15 is an exemplary flowchart illustrating managing the network failure of one cloud SIM card, in accordance with some embodiments.

FIG. 15 is an exemplary flowchart 1500 illustrating managing the network failure of one cloud SIM card. At step 1502, network failure of one cloud SIM card 132 refers to the circumstance in which a cloud SIM card 132 can no longer provide data service, and it cannot be restored within a certain period of time. To avoid the network failure of both cloud SIM cards, a wireless client 125 may acquire two cloud SIM cards 132 of different operators. At step 1504, the wireless client 125 may use the data service of the other cloud SIM card 132 to download another cloud SIM card 132 from the cloud SIM card server 105. The failed cloud SIM card 132 is deactivated, and the newly downloaded cloud SIM card 132 is activated in its card slot, as shown in step 1506.

During the registration of the new cloud SIM card, the wireless client 125 may send the authentication request made from the network to the cloud SIM card server 105 using the data service of the cloud SIM card 132 that can provide the service, as shown in step 1508. The cloud SIM card server 105 may calculate an authentication result using the authentication algorithm and sends the authentication result to the wireless client 125 using the data service of the cloud SIM card 132 that can provide the service. The wireless client 125 may return the result to the network. Note the authentication ends if the authentication result is in line with that expected by the network, after which, the new cloud SIM card 132 will be successfully registered to the network. At step 1510, network restoration may be achieved after the new cloud SIM card is successfully registered.

Figure 16:
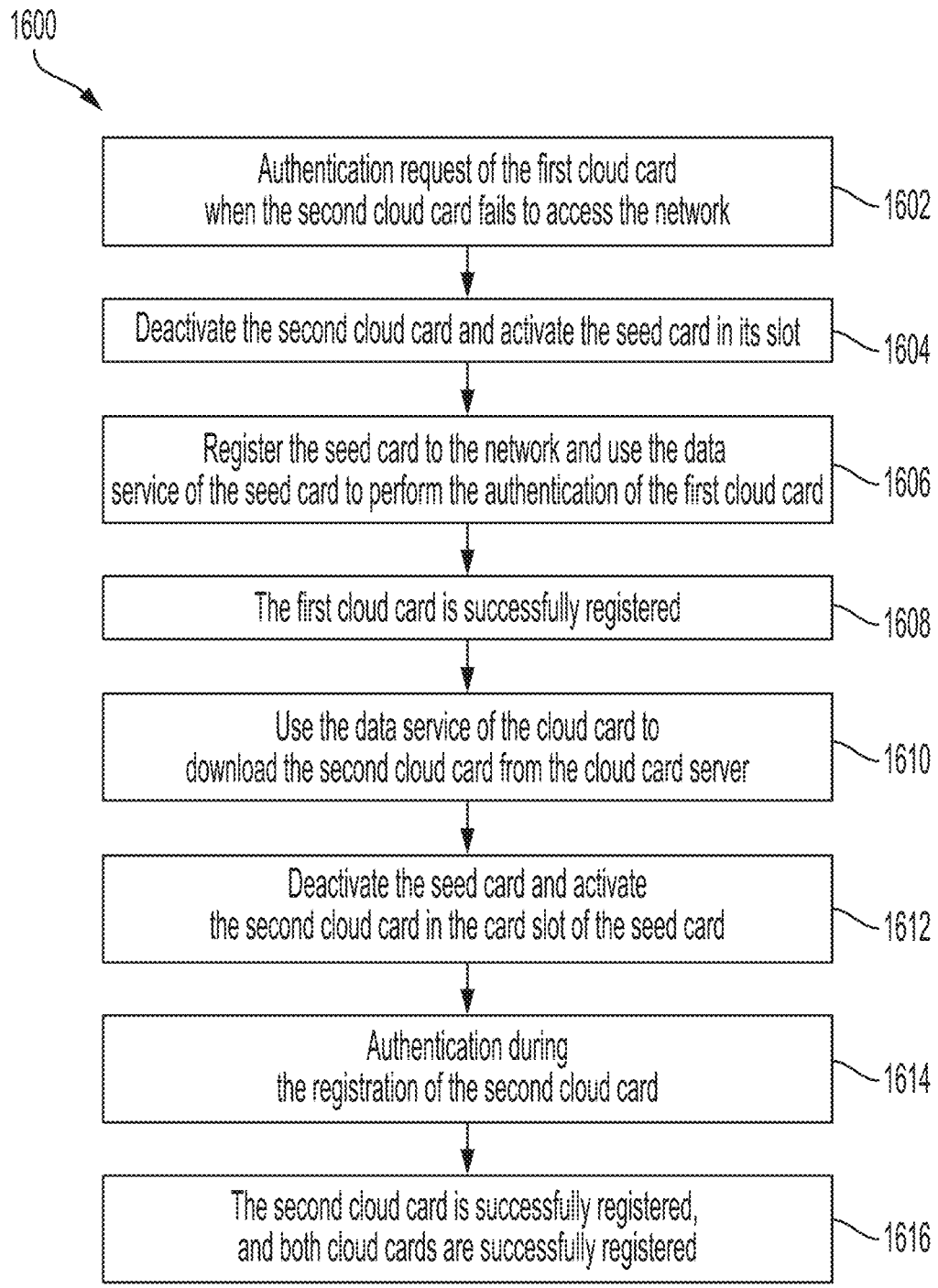
FIG. 16 is an exemplary flowchart illustrating the authentication request of the first cloud SIM card when the second cloud SIM card fails to access the network, in accordance with some embodiments.

FIG. 16 is an exemplary flowchart 1600 illustrating the authentication request of the first cloud SIM card 132 when the second cloud SIM card 132 fails to access the network. At step 1602, an authentication request of the first cloud SIM card 132 may be made when the second cloud SIM card 132 fails to access the network. The second cloud SIM card 132 may be deactivated, and the soft SIM card 150 may be activated in its card slot, as shown in step 1604. The system may then use the data service of the soft SIM card 150 for the authentication of the first cloud SIM card 132 after the soft SIM card 150 is registered to the network, as shown in step 1606. After the soft SIM card 150 is registered to the network, the wireless client may use the data service of the soft SIM card 150 to send authentication request made from the network to the cloud SIM card server 105. The cloud SIM card server 105 may calculate an authentication result by the authentication algorithm, and send the authentication result to the wireless client 125 using the data service of the first cloud SIM card 132. The wireless client may return the result to the network. If the authentication result is in line with that expected by the network, the authentication ends.

After the authentication of the first cloud SIM card ends, the first cloud SIM card 132 may be successfully registered to the network, as shown in step 1608. At step 1610, the wireless client may use the data service of the first cloud SIM card 132 to download the second cloud SIM card 132 from the cloud SIM card server 105. At step 1612, the soft SIM card 150 may be deactivated, and the second cloud SIM card 132 may be activated at its card slot.

When the second cloud SIM card 132 is being registered, an authentication request may be made from the network, as shown in step 1614. The terminal uses the data service of the first cloud SIM card 132 to send the authentication request to the cloud SIM card server 105. The cloud SIM card server 105 may calculate an authentication result by the authentication algorithm and send the authentication result back to the wireless client 125 using the data service of the first cloud SIM card 132. The wireless client may send the authentication result to the network. The authentication ends if such an authentication result is in line with that expected by the network. After the authentication of the second cloud SIM card 132 ends, the second cloud SIM card 132 may be successfully registered to the network and now both cloud SIM cards 132 are successfully registered, as shown in step 1616. At that point, the authentication and network restoration of dual cloud SIM cards ends.

Figure 17:
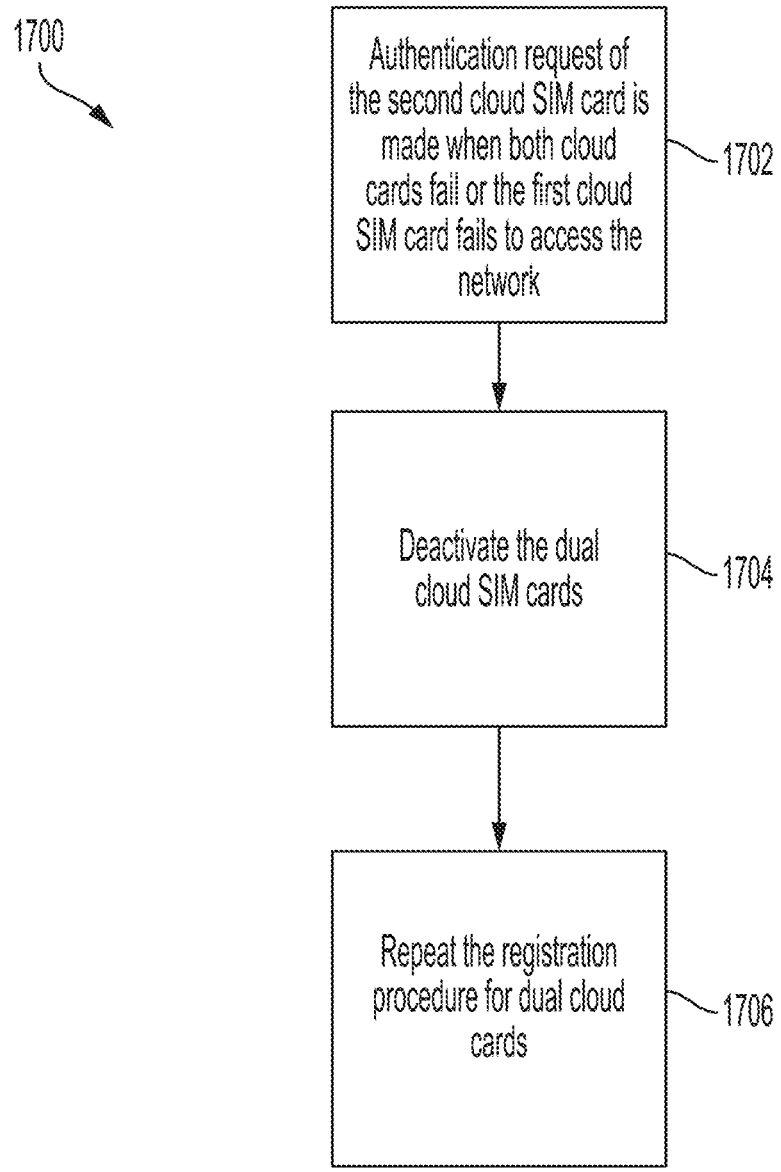
FIG. 17 is an exemplary flowchart illustrating repetition of the registration procedure for dual cloud SIM cards when dual cloud SIM cards fail to access the network, in accordance with some embodiments.

FIG. 17 is an exemplary flowchart 1700 illustrating repetition of the registration procedure for dual cloud SIM cards when dual cloud SIM cards fail to access the network. At step 1702, an authentication request of the second cloud SIM card 132 is made when both cloud SIM cards 132 fail or the first cloud SIM card 132 fails to access the network. At step 1704, the dual cloud SIM cards are deactivated, which is equivalent to removing both cloud SIM cards 132 from the card slots. At step 1506, the registration process for dual cloud SIM cards discussed in FIG. 10 is repeated.

This disclosure describes a technique using a user interface to determine how to activate/deactivate the dynamic switch of a network card. Moreover, the disclosure describes acquiring and using a cloud SIM card, which is downloaded from a cloud server, similarly like a physical SIM card 130. Also, disclosure describes various scenarios for switching a network between the user's physical SIM card 130 and the cloud SIM card. In addition, the disclosure describes numerous techniques for authenticating dual cloud SIM cards using a soft SIM card 150 (i.e., physical SIM card) while minimizing roaming charges.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for switching between different SIM cards for wireless service, comprising:
   detecting a status of a network used for voice and data;
   determining if a physical SIM card is a network card in a wireless client;
   when the physical SIM card is the network card, determining whether the wireless client includes one or more cloud cards;
   when the wireless client includes one or more cloud cards, detecting a network status of the physical SIM card;
   assessing whether the network status of the physical SIM card or the status of the network requires using the one or more cloud cards; and
   when the one or more cloud cards are required, switching the network card from the physical SIM card to the one or more cloud cards.

2. The method of claim 1, wherein detecting a status of a network comprises detecting the signal strength, signal quality, network type, latency, or network speed of the network.

3. The method of claim 1, wherein switching the network card comprises selecting the one or more cloud SIM cards having one or more network operators different from an operator of the physical SIM card.

4. The method of claim 1, wherein detecting a network status of the physical SIM card comprises determining whether the physical SIM card is registered with the network.

5. The method of claim 1, wherein detecting a network status of the physical SIM card comprises comparing a current location of the physical SIM card and a mobile country code of the wireless client.

6. A method for switching between different SIM cards for wireless service, comprising:
   determining a plurality of cloud SIM cards are available in a wireless client coupled to a network, wherein a first cloud card of the plurality of cloud SIM cards is operating as a network card providing service to the wireless client;
   monitoring signal levels of the plurality of cloud SIM cards;
   comparing the signal levels of the plurality of cloud SIM cards;
   determining whether to switch the network card from the first cloud card to a second cloud card of the plurality of SIM clouds cards having a signal level stronger than that of the first cloud card;
   in response to the network card needing to be switched, switching the network card from the first cloud card to the second cloud card.

7. The method of claim 6, wherein determining the plurality of cloud SIM cards are available comprises determining a dual cloud SIM card arrangement.

8. The method of claim 6, wherein determining the plurality of cloud SIM cards are available comprises determining a network status of a physical SIM card.

9. The method of claim 6, wherein comparing the signal levels of the plurality of cloud SIM cards comprises defining a number of ranges of the signal levels for comparing the signal levels.

10. The method of claim 6, wherein monitoring the signal levels of the plurality of cloud SIM cards comprises monitoring the signal levels of the plurality of cloud SIM cards in a loop.

11. A method for switching between different SIM cards for wireless service, comprising:
    detecting a status of a network used for voice and data;
    determining if one or more cloud SIM cards is a network card in a wireless client coupled to the network;
    in response to determining the one or more cloud SIM cards is the network card, determining whether the wireless client includes a physical SIM card;
    in response to determining the wireless client includes the physical SIM card, detecting a network status of the one or more cloud SIM cards;
    assessing whether the network status of the one or more cloud SIM cards or the status of the network requires using the physical SIM card; and
    when the physical SIM card is required, switching the network card from the one or more cloud SIM cards to the physical SIM card.

12. The method of claim 11, wherein the step of assessing comprises detecting network and registration failure of the one or more cloud SIM cards.

13. The method of claim 11, wherein the step of assessing comprises determining whether the one or more physical SIM cards is registered with the network.

14. The method of claim 11, wherein the step of assessing comprises determining whether there is enough data in a data plan of the one or more cloud SIM cards for operation.

* * * * *